United States Patent
Ryu et al.

(10) Patent No.: US 9,794,950 B2
(45) Date of Patent: Oct. 17, 2017

(54) METHOD AND APPARATUS FOR ALLOCATING RESOURCES FOR D2D COMMUNICATION

(71) Applicant: Samsung Electronics Co., Ltd., Suwon-si, Gyeonggi-do (KR)

(72) Inventors: Hyun-Seok Ryu, Yongin-si (KR); Seung-Hoon Park, Seoul (KR); Chi-Woo Lim, Suwon-si (KR); Young-Bin Chang, Anyang-si (KR); Anil Agiwal, Bangalore (IN); Kyung-Kyu Kim, Suwon-si (KR); Dae-Gyun Kim, Seongnam-si (KR); Young-Joong Mok, Suwon-si (KR); Sang-Kyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 14/304,280

(22) Filed: Jun. 13, 2014

(65) Prior Publication Data

US 2014/0376458 A1    Dec. 25, 2014

(30) Foreign Application Priority Data

Jun. 13, 2013  (KR) .................. 10-2013-0067670
Mar. 20, 2014  (KR) .................. 10-2014-0033011

(51) Int. Cl.
*H04W 72/08* (2009.01)
*H04W 52/14* (2009.01)
*H04W 52/38* (2009.01)
*H04W 72/04* (2009.01)
*H04W 52/24* (2009.01)

(52) U.S. Cl.
CPC ....... *H04W 72/085* (2013.01); *H04W 52/146* (2013.01); *H04W 52/383* (2013.01); *H04W 52/241* (2013.01); *H04W 52/246* (2013.01); *H04W 72/042* (2013.01)

(58) Field of Classification Search
None
See application file for complete search history.

(56) References Cited

U.S. PATENT DOCUMENTS

| 2008/0069033 A1 | 3/2008 | Li et al. |
| 2008/0069039 A1 | 3/2008 | Li et al. |
| 2008/0069062 A1 | 3/2008 | Li et al. |
| 2008/0069063 A1* | 3/2008 | Li .................. H04W 88/06 370/338 |

(Continued)

FOREIGN PATENT DOCUMENTS

| KR | 10-2009-0062435 A | 6/2009 |
| WO | 2010/005348 A1 | 1/2010 |
| WO | 2013/062310 A1 | 5/2013 |

*Primary Examiner* — Rhonda Murphy
(74) *Attorney, Agent, or Firm* — Jefferson IP Law, LLP

(57) ABSTRACT

A method for allocating resources for Device-to-Device (D2D) communication in a transmitting terminal is provided. The method includes receiving broadcast resource allocation information for the D2D communication from a Base Station (BS), and measuring a channel quality of a downlink signal received from the BS and, if the measured channel quality is smaller than a predetermined threshold, conducting the D2D communication using the resource allocation information.

22 Claims, 18 Drawing Sheets

(56) References Cited

U.S. PATENT DOCUMENTS

2010/0210238 A1    8/2010  Cho et al.
2011/0223953 A1*   9/2011  Lee .................... H04W 76/023
                                                       455/509
2012/0300749 A1*  11/2012  Kondo ................ H04W 72/085
                                                       370/331

* cited by examiner

METHOD AND APPARATUS FOR ALLOCATING RESOURCES FOR D2D COMMUNICATION

CROSS-REFERENCE TO RELATED APPLICATION(S)

This application claims the benefit under 35 U.S.C. §119(a) of a Korean patent application filed on Jun. 13, 2013 in the Korean Intellectual Property Office and assigned Serial number 10-2013-0067670, and of a Korean patent application filed on Mar. 20, 2014 in the Korean Intellectual Property Office and assigned Serial number 10-2014-0033011, the entire disclosure of each of which is hereby incorporated by reference.

TECHNICAL FIELD

The present disclosure relates to a method and apparatus for allocating resources for Device-to-Device (D2D) communication.

BACKGROUND

Various techniques have recently been proposed to effectively prevent data congestion in cellular communication systems. For example, the rapid proliferation of smartphones is a driving force behind a rise in the use of a large volume of mobile content. To distribute the load of an evolved Node B (eNB), Device-to-Device (D2D) communication between User Equipment (UEs) has been proposed. D2D communication can be conducted in a cellular communication system. A UE conducting D2D communication (hereinafter, referred to as a 'D2D UE') may operate as a UE conducting cellular communication (hereinafter, referred to as a 'cellular UE').

Typically, an eNB controls the transmission power of UEs to reduce interference from other cells, increase the battery lifespans of the UEs, and receive data and control information with appropriate power from the UEs within a cell managed by the eNB in the cellular communication system.

The eNB may notify the UEs of parameters needed for power control. The UEs may also estimate some parameters for power control on their own and set their transmission power based on these parameters. In this manner, the eNB measures parameters that may affect the UEs, such as channel qualities between the eNB and the UEs, reception signal strengths, or the like, with the aid of the UEs and reflects the parameters in power control for the UEs.

In typical cellular communication, an uplink receiver is a fixed eNB. Accordingly, an average noise and interference power received at the eNB from a neighbor cell may be measured over a long term. On the other hand, a receiver is a UE in D2D communication. Due to the mobility of the UE, it is difficult to measure average interference and noise ratios of neighbor UEs over a long term. As a result, power control for UEs in cellular communication is not viable for D2D communication. For example, in the case of D2D communication on an uplink of a cellular system (hereinafter, referred to as a 'cellular uplink'), a transmitting D2D UE transmits a D2D communication signal on the cellular uplink and a receiving D2D UE receives the D2D communication signal on the cellular uplink. For power control for D2D communication, interference with an eNB caused by the transmitting D2D UE, interference with the receiving D2D UE caused by a cellular UE that transmits uplink data and control information, and interference with another receiving D2D UE caused by the transmitting D2D UE on the cellular uplink should be measured. As the number of channels to be measured increases, the amount of information to be exchanged for measuring the quality of the channels also increases, thereby increasing overhead. The increased overhead may become a serious problem in a D2D data multicast/broadcast scenario in which a transmitting D2D UE conducts D2D communication with multiple receiving D2D UEs. If a UE operates in Radio Resource Control (RRC)_IDLE mode, the UE should transmit a parameter for power control to the eNB to help the eNB to determine transmission power for the UEs. In this case, a Random Access (RA) procedure is additionally needed to switch RRC_IDLE-mode UEs to RRC_CONNECTED mode. Additional signaling involved in the RA procedure may cause overhead to the eNB. Considering that the D2D communication function may be executed in many other devices including home appliances such as a smart TV, a smart refrigerator, and the like, a laptop computer, a tablet Personal Computer (PC), and the like as well as a cellular device such as a smartphone, the overhead of RA signaling may impose a huge overhead on the eNB.

On the assumption that the quality of the afore-mentioned channels can be measured fully, a change may occur in the mobility of UEs including a D2D UE and a cellular UE and a pair of UEs for D2D communication at the moment when the already-measured channel quality values are reflected. The resulting channel mismatch may degrade system performance.

If D2D communication is conducted within a cell managed by an eNB, cellular communication resources may be shared as D2D communication resources according to an underlay scheme or time/frequency resources orthogonal to cellular communication resources may be used as D2D communication resources according to an overlay scheme. According to the underlay scheme, D2D communication interferes with legacy UEs conducting cellular communication, whereas according to the overlay scheme, D2D communication causes in-band emission or Inter-Carrier Interference (ICI)/Inter-Symbol Interference (ISI) to an eNB that receives cellular data or control information from legacy UEs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling transmission power of a Device-to-Device (D2D) UE using parameters acquired during measurement of a downlink or uplink channel quality between an evolved Node B (eNB) and the D2D UE in a cellular communication system.

In accordance with an aspect of the present disclosure, a method for allocating resources for D2D communication in a transmitting terminal is provided. The method includes receiving broadcast resource allocation information for the D2D communication from a Base Station (BS), measuring a channel quality of a downlink signal received from the BS, and, if the measured channel quality is smaller than a predetermined threshold, conducting the D2D communication using the resource allocation information.

In accordance with another aspect of the present disclosure, a method for allocating resources for D2D communication in a BS is provided. The method includes broadcasting resource allocation information for the D2D communication, and transmitting, upon receipt of a resource allocation request from a transmitting terminal, a response including information about a part of a resource area indicated by the resource allocation information to the transmitting terminal, the part of the resource area being dedicated to the transmitting terminal.

In accordance with another aspect of the present disclosure, a transmitting terminal configured to conduct D2D communication is provided. The transmitting terminal includes a transceiver configured to receive broadcast resource allocation information for the D2D communication from a BS, and a controller configured to measure a channel quality of a downlink signal received from the BS and, if the measured channel quality is smaller than a predetermined threshold, to control the transceiver to conduct the D2D communication using the resource allocation information.

In accordance with another aspect of the present disclosure, a BS configured to conduct D2D communication is provided. The BS includes a transceiver configured to broadcast resource allocation information for the D2D communication, and a controller configured to, upon receipt of a resource allocation request from a transmitting terminal at the transceiver, control the transceiver to transmit a response including information about a part of a resource area indicated by the resource allocation information to the transmitting terminal, the part of the resource area being dedicated to the transmitting terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1A:
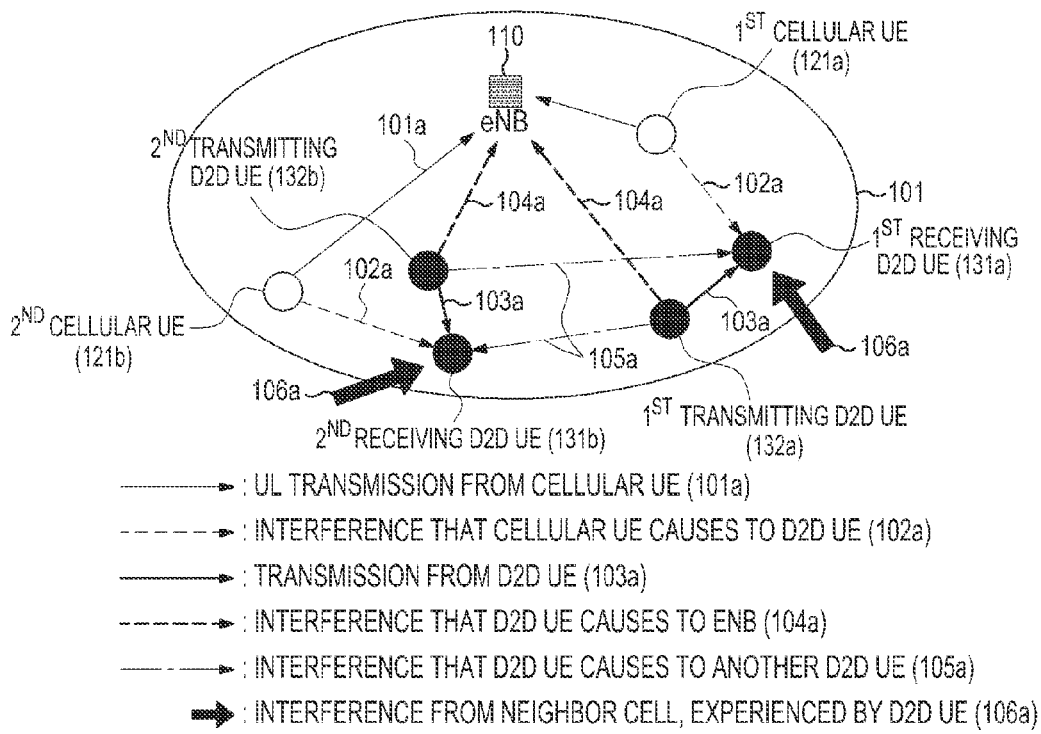
FIG. 1A illustrates a Device-to-Device (D2D) unicast operation in a cellular communication system according to an embodiment of the present disclosure.

FIG. 1A illustrates a Device-to-Device (D2D) unicast operation in a cellular communication system according to an embodiment of the present disclosure.

Referring to FIG. 1A, the cellular communication system includes an evolved Node B (eNB) 110, cellular User Equipment (UEs) operating in cellular communication mode, and D2D UEs operating in D2D communication mode, within cell coverage 101. For the convenience of description, the cellular UEs are marked with 'O' and the D2D UEs are marked with '●'. The following description is given with the appreciation that D2D communication is conducted on an UpLink (UL) in a cellular system. A D2D UE transmits/receives D2D data and D2D control information in UL resources of the cellular system. For the convenience of description, a D2D UE operating as a transmitter in D2D communication is referred to as a 'transmitting D2D UE' and a D2D UE operating as a receiver in D2D communication is referred to as a 'receiving D2D UE'.

For example, if each of first and second cellular UEs 121a and 121b is transmitting UL data to the eNB 110 as indicated by reference numeral 101a, a first receiving D2D UE 131a and a second receiving D2D UE 131b, which receive D2D data, experience interference from the UL data transmission 101a from the first and second cellular UEs 121a and 121b to the eNB 110. In addition, the first and second receiving D2D UEs 131a and 131b experience interference 105a from other D2D communication within the cell coverage 100. The eNB 110 experiences interference 104a from D2D communication 103a of first and second transmitting D2D UEs 132a and 132b. In addition, the first and second receiving D2D UEs 131a and 131b experience interference 106a from a neighbor cell in the cellular communication system.

Figure 1B:
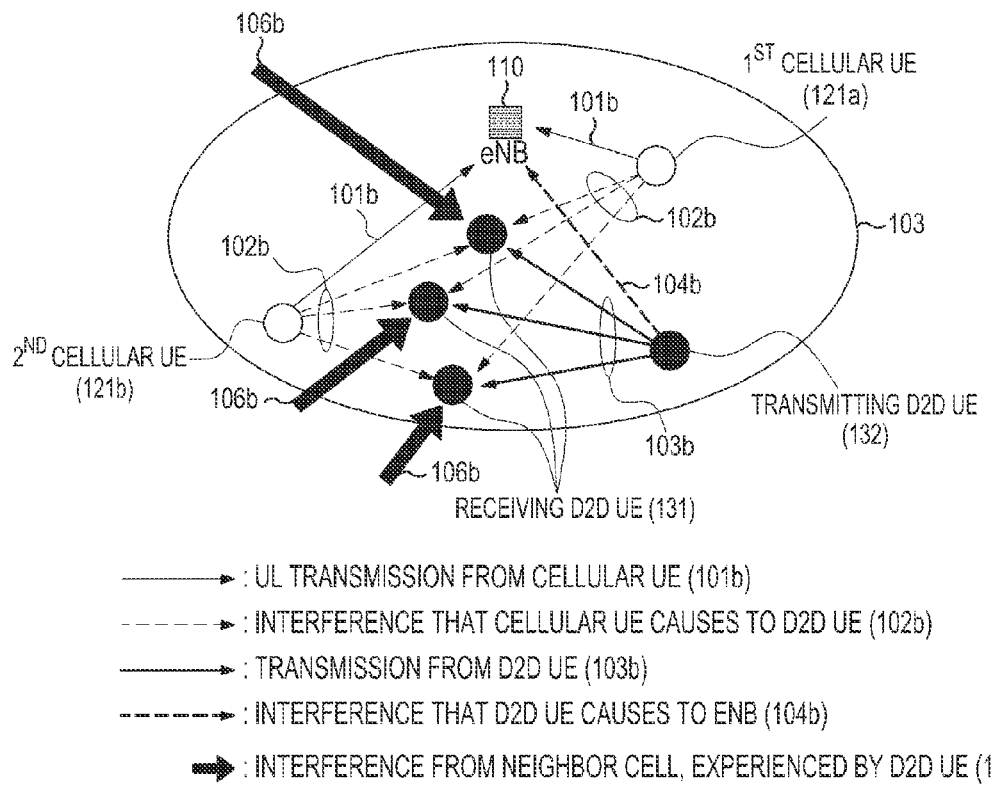
FIG. 1B illustrates a D2D multicast operation in a cellular communication system according to an embodiment of the present disclosure.

FIG. 1B illustrates a D2D multicast operation in the general cellular communication system according to an embodiment of the present disclosure.

Referring to FIG. 1B, the cellular communication system includes the eNB 110, cellular UEs operating in cellular communication mode, and D2D UEs operating in D2D communication mode. For the convenience of description, the cellular UEs are marked with 'O' and the D2D UEs are marked with '●'.

A transmitting D2D UE 132 multicasts or broadcasts data to a plurality of receiving D2D UEs 131 within cell coverage 103 in the same communication environment as illustrated in FIG. 1A. Each of the receiving D2D UEs 131 experiences interference 102b from cellular UL data transmission 101b of a first cellular UE 121a and a second cellular UE 131b that transmit UL data to the eNB 110. The eNB 110 experiences interference 104b from D2D communication 103b of the transmitting D2D UE 132. In addition, the receiving D2D UEs 131 experience interference 106b from a neighbor cell. Compared to FIG. 1A, since the single transmitting D2D UE 132 transmits data to the plurality of receiving D2D UEs 131, Noise and Interference (NI) experienced by the individual receiving D2D UEs 131 and the interference experienced by the eNB 110 should be considered in determining transmission power of the transmitting D2D UE 132.

When the cellular communication system supports D2D communication, the system should allocate resources to a D2D UE operating in the D2D communication mode, taking into account various interferences that might occur, as described above. One resource allocation schemes for a D2D UE involves allocating dedicated D2D resources orthogonal to resources of a cellular UE operating in the cellular communication mode to a D2D UE that shares cellular resources available to the cellular communication system, and another scheme involves sharing the resources of a cellular UE with a D2D UE. The allocation of dedicated D2D resources prevents the D2D UE from interfering with the cellular UE within the same cell. However, the utilization of resources is decreased and the load of the cellular communication system is not efficiently distributed. The use of resources orthogonal along a frequency axis for D2D communication and cellular communication may cause in-band emission and ICI/ISI to an eNB receiver. Accordingly, if a Frequency Division Multiplexing (FDM)-based overlay scheme is used, a transmitting D2D UE should perform power control.

On the other hand, if resources are shared between D2D communication and cellular communication according to an underlay scheme, mutual interference occurs between a D2D UE and a cellular UE within the same cell. Consequently, the performance of both cellular communication and D2D communication conducted in the cellular UE and the D2D UE may be degraded. If an eNB can control the mutual interference, the underlay scheme may maximize the utilization of resources and efficiently distribute the load of the cellular communication system (data offloading).

In other words, there is a need for methods for trading off resource use efficiency and interference in the overlay and underlay schemes, for D2D communication in the general cellular communication system. One of the methods is to control transmission power for D2D communication in the underlay scheme.

Figure 2:
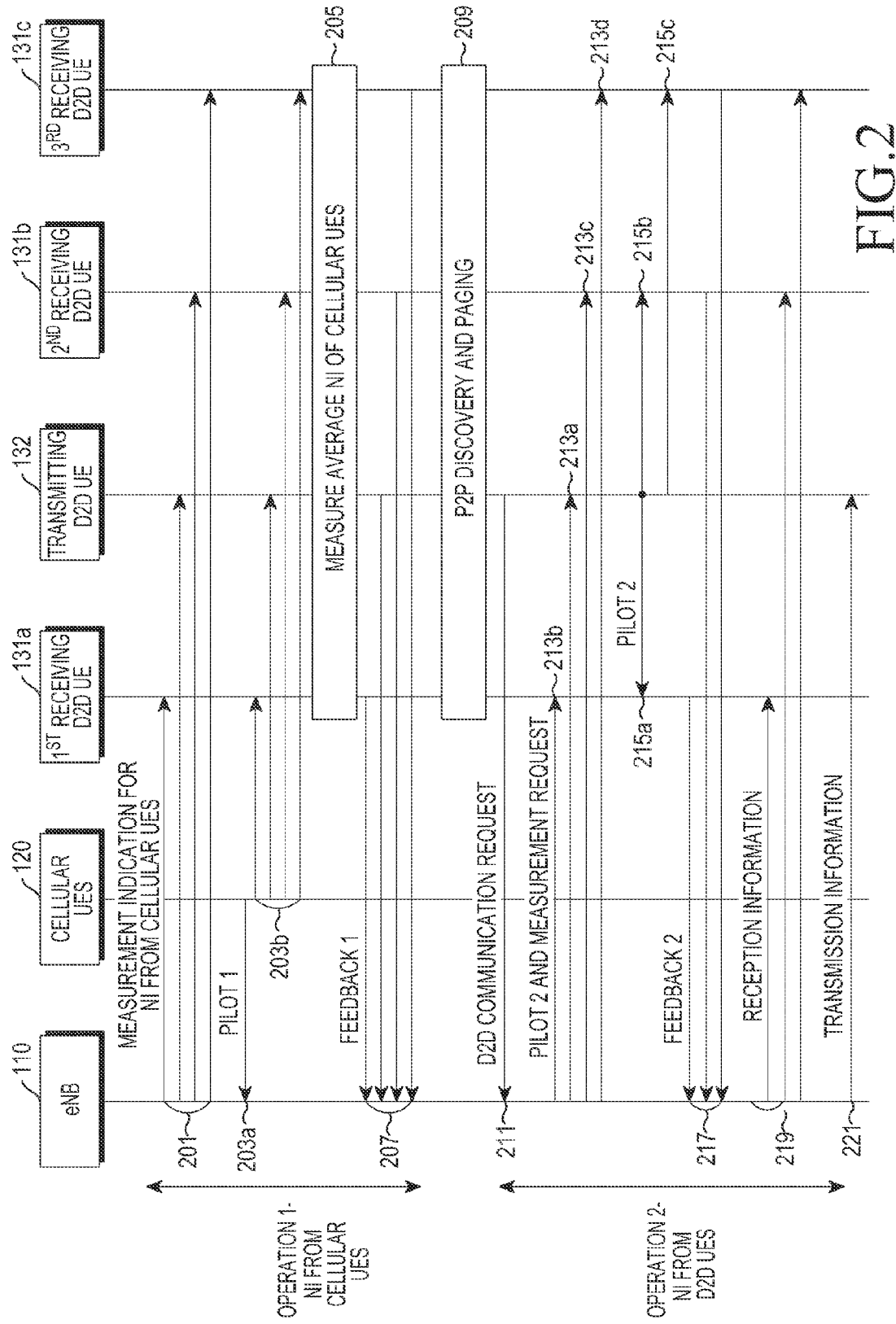
FIG. 2 is a diagram illustrating a signal flow for controlling transmission power for D2D communication in a cellular communication system according to an embodiment of the present disclosure.

FIG. 2 is a diagram illustrating a signal flow for an operation for controlling transmission power for D2D communication in a cellular communication system according to an embodiment of the present disclosure.

Referring to FIG. 2, the cellular communication system has the same configuration as illustrated in FIG. 1B and uses the underlay scheme in which a cellular UL is shared between D2D communication and cellular communication in FIG. 2. The power control operation for D2D communication is largely divided into operation 1 for measuring NI from cellular UEs and operation 2 for measuring NI from D2D UEs.

Referring to FIG. 2, the eNB 110 transmits an NI measurement indication to all D2D UEs involved in a multicast operation, for example, the transmitting D2D UE 132, the first receiving D2D UE 131a, the second receiving D2D UE 131b, and the third receiving D2D UE 131c, requesting the D2D UEs to measure NI caused by cellular UEs 120 in operation 201. To enable the first, second, and third receiving D2D UEs 131a, 131b, and 131c to measure the NI caused by the cellular UEs 120, the eNB 110 also transmits, as Downlink Control Information (DCI), Identifiers (IDs) of UEs that will conduct cellular communication, communication times of the UEs, and information about resources to be used by the UEs from among the cellular UEs 120.

In operation 203a, the cellular UEs 120 transmit first pilots (Pilots 1) to the eNB 110 on ULs. Each of Pilots 1 may be configured as a Sounding Reference Signal (SRS) or a Random Access (RA) preamble. Alternatively, Pilots 1 may be sequences with which the first, second, and third receiving D2D UEs 131a, 131b, and 131c may measure the NI caused by the cellular UEs 120. In operation 203b, the first, second, and third receiving D2D UEs 131a, 131b, and 131c and the transmitting D2D UE 132 receive Pilots 1 from the cellular UEs 120 according to the NI measurement indication received from the eNB 110.

The first, second, and third receiving D2D UEs 131a, 131b, and 131c and the transmitting D2D UE 132 measure the NI caused by the cellular UEs 120 in the received Pilots 1 and average the NI measurements in operation 205. In operation 207, the first, second, and third receiving D2D UEs 131a, 131b, and 131c and the transmitting D2D UE 132 transmit the average NI values as first feedback (Feedback 1) to the eNB 110.

The transmitting D2D UE 132 and first, second, and third receiving D2D UEs 131a, 131b, and 131c establish D2D communication links by Peer-to-Peer (P2P) discovery and paging in operation 209. For example, it is assumed that the transmitting D2D UE 132 establishes multicast D2D communication links with the first, second, and third receiving D2D UEs 131a, 131b, and 131c by the P2P discovery and paging. According to another embodiment of the present disclosure, the eNB 110 may perform the P2P discovery and paging among the UEs in operation 209. In this case, the transmitting D2D UE 132 that wants to communicate with a specific D2D UE requests D2D communication to the eNB 110. When requesting the D2D communication, the transmitting D2D UE 312 designates a receiving D2D UE. Then the eNB 110 communicates with the designated receiving D2D UE according to the request of the transmitting D2D UE 132. This operation may be performed in a legacy cellular communication procedure.

Subsequently, the transmitting D2D UE 132 transmits a D2D communication request to the eNB 110 in operation 211. It is assumed herein that the transmitting D2D UE 132 uses resources already allocated for the D2D communication request by the eNB 110. The D2D communication request may be transmitted, for example, through a random access channel, an SRS, a Physical Uplink Control Channel (PUCCH), a Physical Uplink Shared Channel (PUSCH), or the like.

The eNB 110 transmits a Pilot 2 transmission request to the transmitting D2D UE 132 in operation 213a and transmits a measurement result request regarding Pilot 2 of the transmitting D2D UE 132 to the first, second, and third receiving D2D UEs 131a, 131b, and 131c in operations 213b, 213c, and 213d. The eNB 110 also transmits resource allocation information about resources in which the first, second, and third receiving D2D UEs 131a, 131b, and 131c will transmit measurement results in operations 213a, 213b, 213c, and 213d.

The transmitting D2D UE transmits Pilot 2 to the first, second, and third receiving D2D UEs 131a, 131b, and 131c in operations 215a, 215b, and 215c. Then the first, second, and third receiving D2D UEs 131a, 131b, and 131c transmit channel measurements of Pilot 2 received from the transmitting D2D UE 132 as second feedback (Feedback 2) to the eNB 110 in operation 217.

Subsequently, the eNB 110 determines resources for transmission of a D2D communication signal from the transmitting D2D UE 132 and resources for reception of the D2D communication signal at the first, second, and third receiving D2D UEs 131a, 131b, and 131c, based on Feedback 1 being the NI feedbacks for Pilots 1 transmitted from the cellular UEs 120, received in operation 207, and Feedback 2 being the channel measurements of Pilot 2 transmitted from the transmitting D2D UE 132, received in operation 217. In operation 219, the eNB 110 transmits information about the determined resources for reception of a D2D communication signal, as reception information, to the first, second, and third receiving D2D UEs 131a, 131b, and 131c.

In operation 221, the eNB 110 transmits information about the determined resources for transmission of a D2D communication signal, as transmission information, to the transmitting D2D UE 132.

As described above, to allocate resources for D2D communication in the general cellular communication system, channel qualities between cellular UEs and D2D UEs and channel qualities of the D2D UEs may be needed. As a result, signaling overhead increases during channel quality measurement and collection. Moreover, a channel mismatch may occur due to the mobility of the D2D UEs and the cellular UEs. The channel mismatch refers to different channel quality values at a measurement time and a transmission time. Therefore, the signaling overhead of resource allocation for D2D communication should be reduced.

In the cellular communication system, more data is transmitted on a Downlink (DL) than on a UL. Considering this fact, resources are allocated for D2D communication using UL resources of the cellular system according to an embodiment of the present disclosure. In other words, UL cellular resources are shared for D2D communication in the embodiment of the present disclosure. A transmitting D2D UE may transmit data to a receiving D2D UE on a UL of the cellular system. Thus, the receiving D2D UE may receive the data from the transmitting D2D UE on the UL of the cellular system. UL and DL resources may be used in Frequency Division Duplexing (FDD) or Time Division Duplexing (TDD) in the cellular system.

Figure 3A:
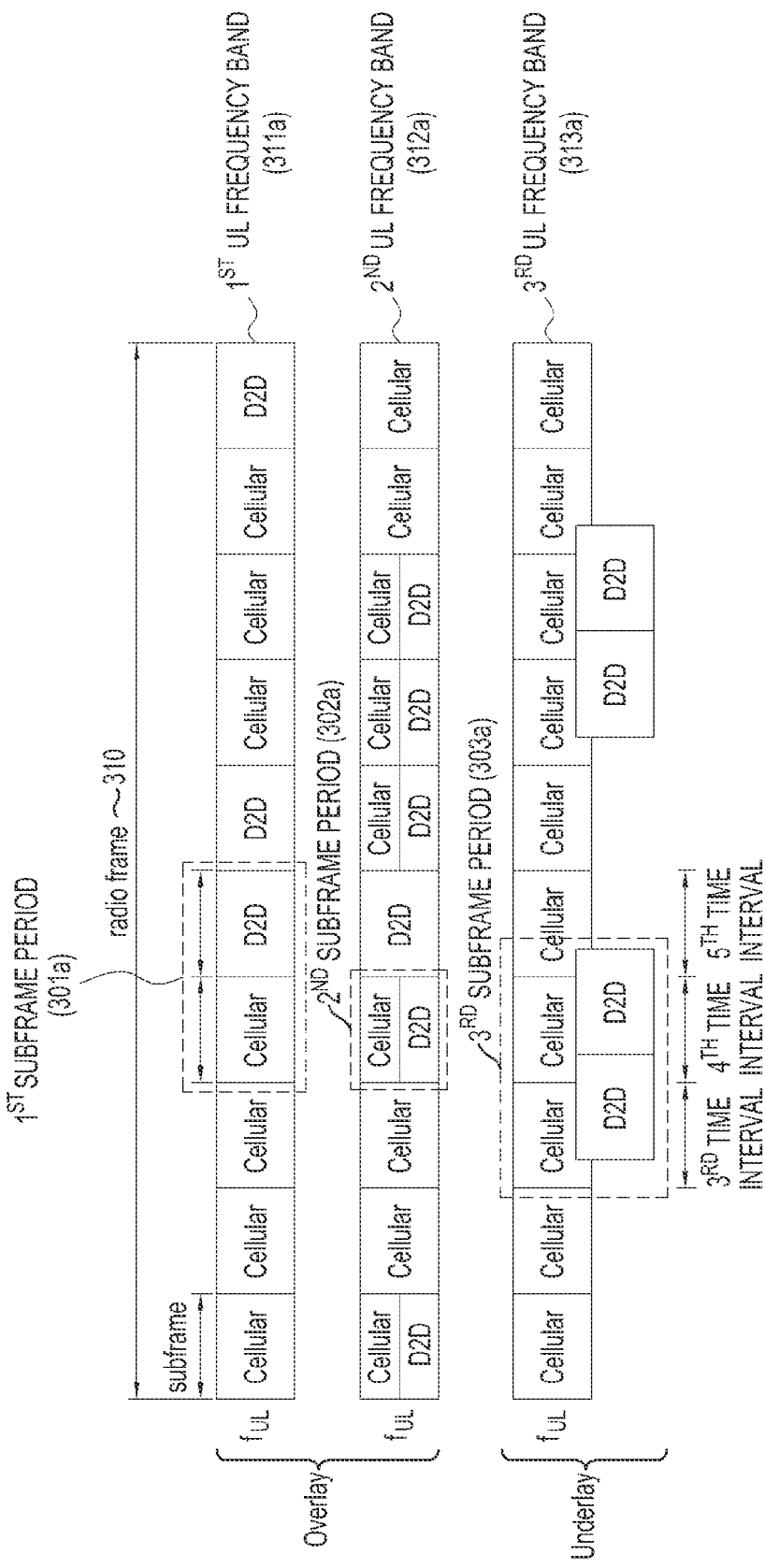
FIG. 3A illustrates a frame structure designed to conduct D2D communication by sharing an uplink frequency band in a cellular communication system according to an embodiment of the present disclosure.

FIG. 3A illustrates a frame structure designed to conduct D2D communication by sharing a UL frequency band in a cellular communication system according to an embodiment of the present disclosure.

Referring to FIG. 3A, one radio frame 310 includes, for example, UL frequency bands $f_{UL}$ distinguished from DL frequency bands $f_{DL}$ in FDD.

In an overlay scheme according to an embodiment of the present disclosure, dedicated D2D communication resources distinguished from cellular communication resources are allocated in time division or frequency division in a UL frequency band. For example, D2D communication resources are allocated in time division with pre-allocated cellular communication resources in a first subframe period 301a corresponding to fourth and fifth time intervals in a first UL frequency band 311a to which the overlay scheme is applied. In another example of the overlay scheme, D2D communication resources are allocated in frequency division with pre-allocated cellular communication resources in a second subframe period 302a corresponding to the fourth time interval in a second UL frequency band 312a. In an underlay scheme according to an embodiment of the present disclosure, resources are shared between cellular communication and D2D communication. For example, if all subframes of a third UL frequency band 313a are allocated for cellular communication, the time-frequency resources allocated for cellular communication in a third subframe period 303a corresponding to the third and fourth time intervals may be shared for D2D communication in the third UL frequency band 313a.

Figure 3B:
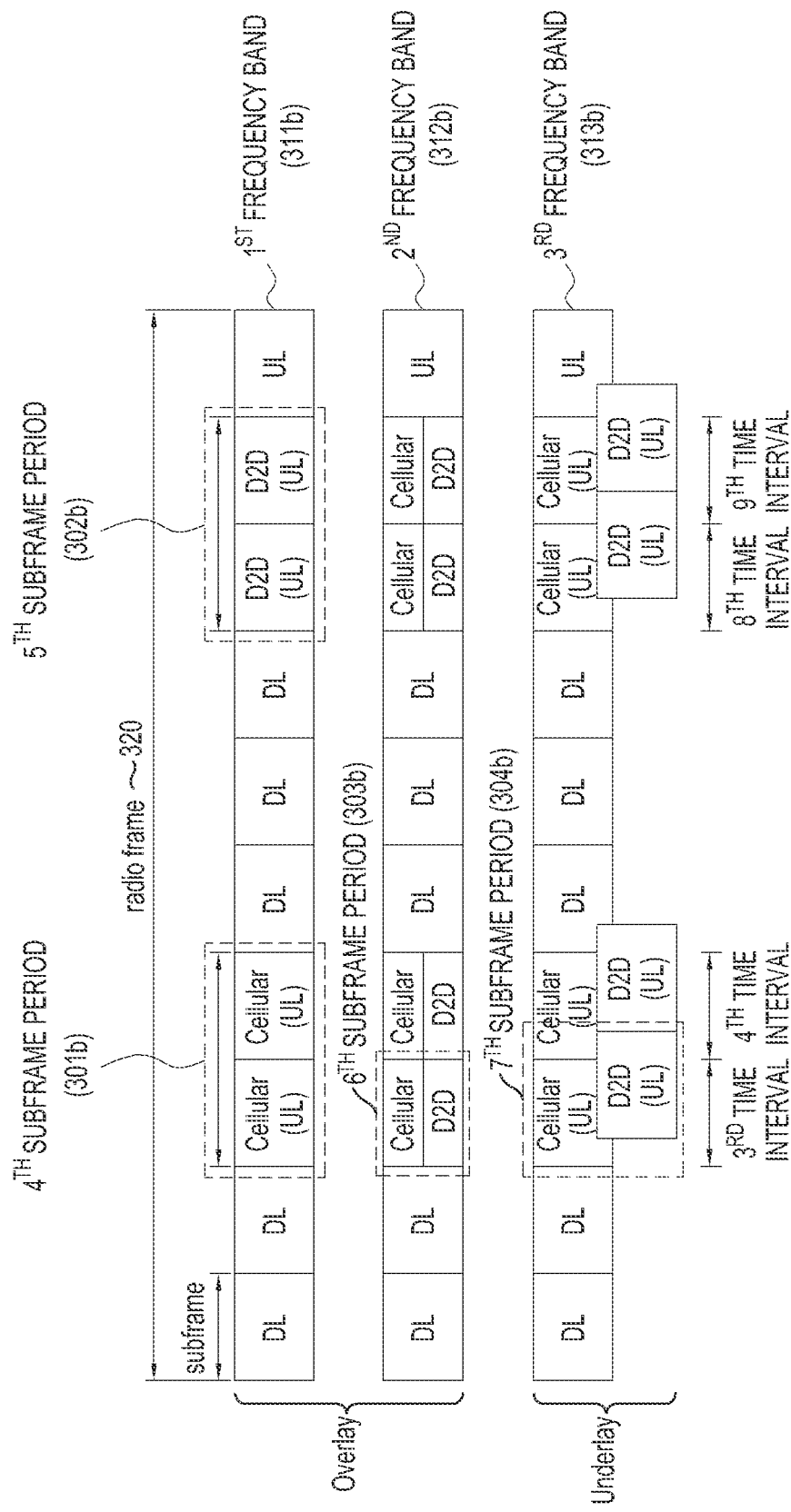
FIG. 3B illustrates a frame structure designed to conduct D2D communication by sharing an uplink frequency band in a cellular communication system according to an embodiment of the present disclosure.

FIG. 3B illustrates a frame structure designed to conduct D2D communication by sharing a UL frequency band in a cellular communication system according to an embodiment of the present disclosure.

Referring to FIG. 3B, one radio frame 320 includes, for example, DL subframes and UL subframes in TDD in the same frequency band.

In an overlay scheme according to an embodiment of the present disclosure, a fourth subframe period 301b corresponding to third and fourth time intervals is allocated as resources for transmitting UL data of cellular communication in a first frequency band 311b in which DL data and UL data of cellular communication are allocated in time division. Resources for transmitting UL data of D2D communication orthogonal to other subframes in time division are allocated in a fifth subframe period 302b corresponding to eighth and ninth time intervals in which DL data and UL data of cellular communication are allocated in the first frequency band 311b. In another example of the overlay scheme according to an embodiment of the present disclosure, a sixth subframe period 303b corresponding to the third time interval includes UL resources of cellular communication and D2D communication resources in frequency division in a second frequency band 312b in which DL data and UL data of cellular communication are allocated in time division. In an underlay scheme according to an embodiment of the present disclosure, a seventh subframe period 304b corresponding to the third time interval includes D2D communication resources being a time-frequency resource area including resources allocated for UL data transmission of cellular communication in a third frequency band 313b in which DL data and UL data of cellular communication are allocated in time division.

Figure 4:
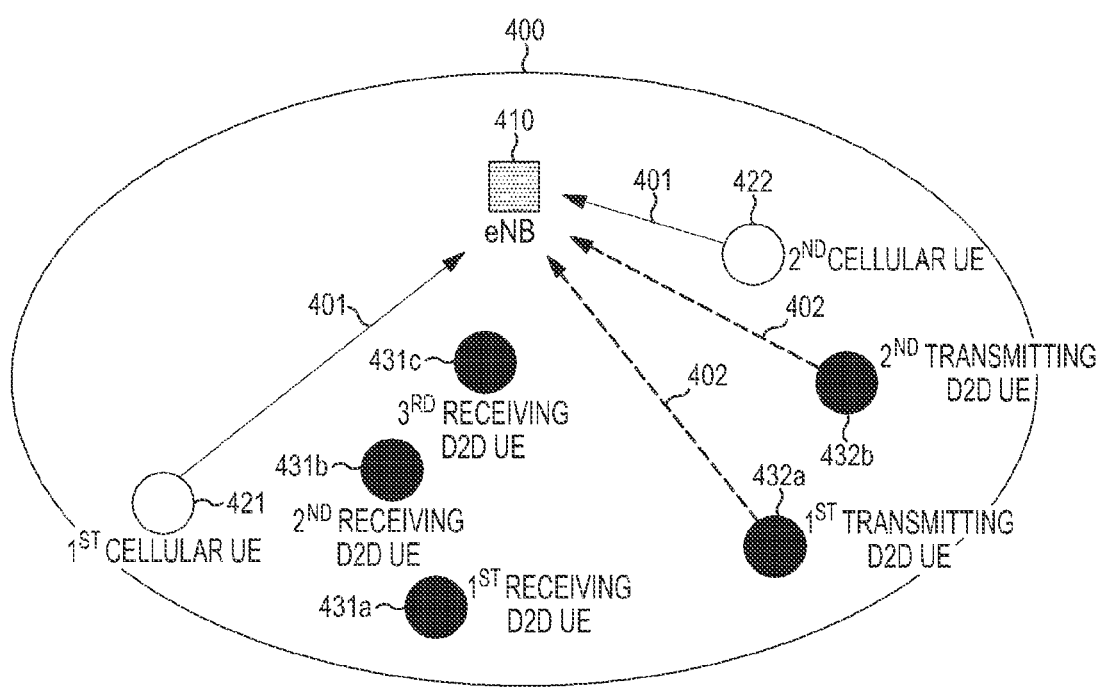
FIG. 4 illustrates interferences considered in determining a resource allocation scheme for D2D communication in a cellular communication system according to an embodiment of the present disclosure.

FIG. 4 illustrates interferences considered in determining a resource allocation scheme for D2D communication in a cellular communication system according to an embodiment of the present disclosure.

Referring to FIG. 4, a first cellular UE 421 and a second cellular UE 422 are transmitting data or control information 401 on ULs to an eNB 410 within the service coverage 400 of the eNB 410. All D2D UEs determine transmitters and receivers of D2D communication by P2P discovery and paging. A decision may be made among the UEs as to which D2D UEs will transmit or receive in a distributed manner during the P2P discovery and paging. In an embodiment of the present disclosure, it is determined that a first transmitting D2D UE 432a and a second transmitting D2D UE 432b will perform D2D transmission and a first receiving D2D UE 431a, a second receiving D2D UE 431b, and a third receiving D2D UE 431c will perform D2D reception. After the D2D communication entities are determined, the first and second transmitting D2D UEs 432a and 432b report the determination result to the eNB 410 and transmit D2D communication requests 402 to the eNB 410. The eNB 410 measures channel qualities between the eNB 410 and the first and second transmitting D2D UEs 432a and 432b using signals corresponding to the D2D communication requests 402a and 402b. For example, the channel qualities may be distances $d_{TX}$ reflecting path losses between the eNB 410 and the first and second transmitting D2D UEs 432a and 432b, or Signal-to-Interference and Noise Ratios (SINRs) or Received Signal Strengths (RSSs) of signals received at the eNB 410 from the first and second transmitting D2D UEs 432a and 432b. The eNB 410 determines a resource allocation scheme for D2D communication based on one of the determined parameters ($d_{TX}$, SINRs, or RSSs) and controls power for D2D communication accordingly.

Typically, UEs that transmit control information and data on ULs in cellular communication perform power control as commanded by an eNB. A UE near to the eNB uses lower power, whereas a UE at a cell edge remote from the eNB uses higher power. This is done for the eNB to receive the control information and the data from the UEs, at a certain power level. The power control of the UEs may reduce in-band emission or ICI/ISI that may occur at the receiver of the eNB. Accordingly, the eNB estimates a reference distance $d_{TX}$ for power control in an embodiment of the present disclosure. Likewise, the D2D UEs may also determine a reference distance $d_{TX}$ for power control using a DL signal received from the eNB.

For example, to allow the eNB 410 to estimate distances $d_{TX}$ from the signals corresponding to the D2D communication requests 402a and 402b of the first and second transmitting D2D UEs 432a and 432b, the first and second transmitting D2D UEs 432a and 432b relatively near to the eNB 410 should transmit the D2D communication requests 402a and 402b with the same power irrespective of their distances to the eNB 410. The eNB 410 may allocate the same power to transmitting D2D UEs within a predetermined distance from the eNB 410. Then the eNB 410 should be able to calculate the distances $d_{TX}$ between the eNB 410 and the first and second transmitting D2D UE 432a and 432b based on the D2D communication requests 402a and 402b. Likewise, the first and second transmitting D2D UEs 432a and 432b should be able to calculate the distances $d_{TX}$ by measuring DL signals received from the eNB 410, such as Cell-specific Reference Signals (CRSs), Demodulation Reference Signals (DM-RSs), Channel State Information Reference Signals (CSI-RSs), Position Reference Signals (P-RSs), Multicast and Broadcast Reference Signals (MBS-RSs), or the like. For the convenience of description, distance-related parameters for calculating a reference distance $d_{TX}$ have been presented herein. However, the afore-described power control operation may be performed in various manners using Reference Signal Received Power (RSRP), Reference Signal Received Quality (RSRQ), Signal to Interference and Noise Ratio (SINR), or the like between an eNB and a UE.

Figure 5A:
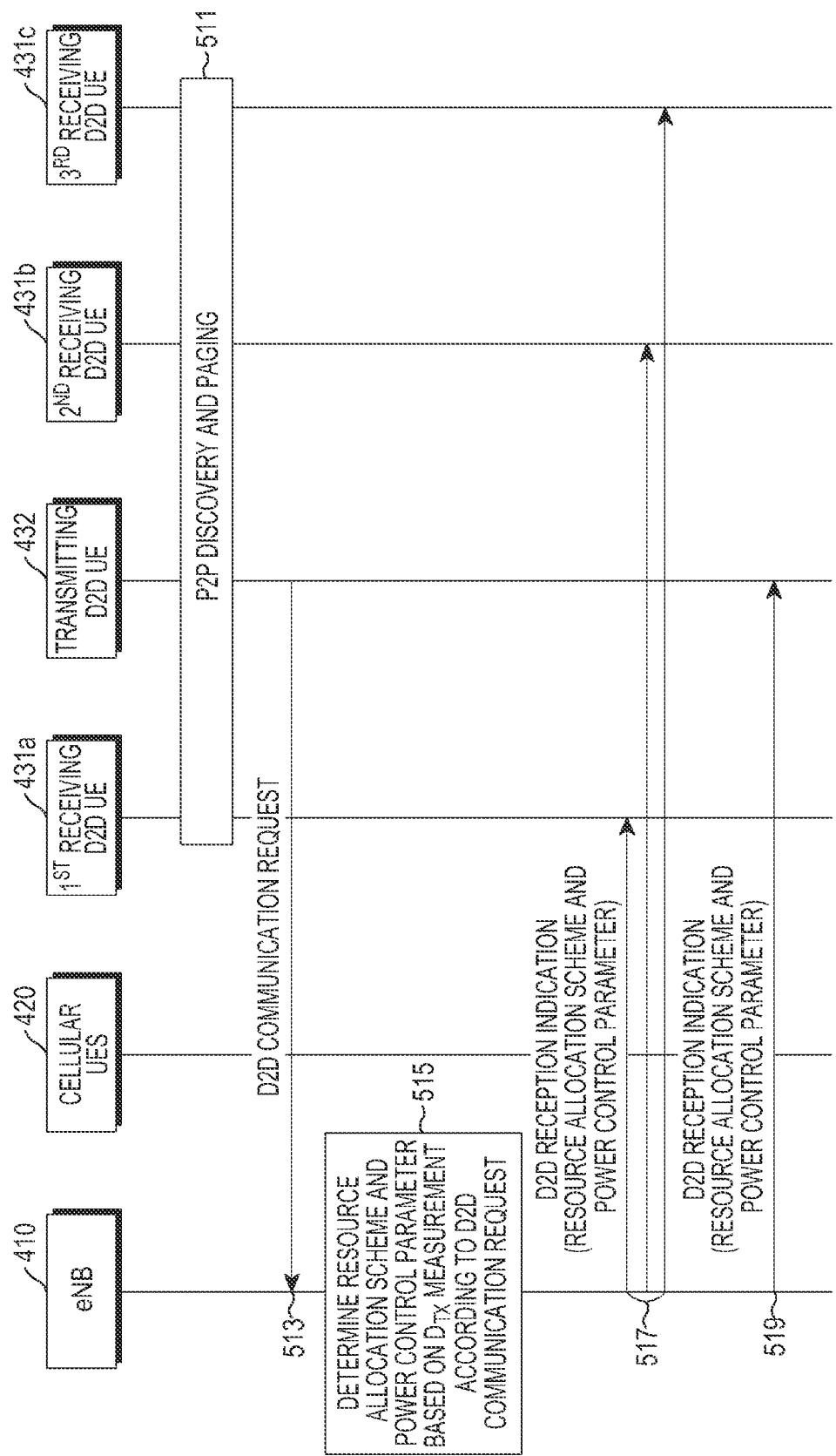
FIG. 5A is a diagram illustrating a signal flow for an operation for determining a resource allocation scheme for D2D communication in a cellular communication system according to an embodiment of the present disclosure.

FIG. 5A is a diagram illustrating a signal flow for an operation for determining a resource allocation scheme for D2D communication in a cellular communication system according to an embodiment of the present disclosure. For the convenience of description, it is assumed that the operation illustrated in FIG. 5A is performed in a cellular communication system having the configuration illustrated in FIG. 4.

Referring to FIG. 5A, D2D communication links are established by a P2P discovery and paging procedure for D2D communication for D2D communication between D2D UEs, (i.e. D2D communication between the transmitting D2D UE 432 and the first, second, and third receiving D2D UE 431a, 431b, and 431c) in operation 511. It is assumed that the eNB 410 has already allocated resources for the P2P discovery and paging procedure. Details of the P2P discovery and paging procedure are beyond the scope of the present disclosure and thus will not be described herein. The D2D communication links may be established in many other methods in addition to the P2P discovery and paging procedure. For example, the eNB 410 or a higher-layer Mobility Management Entity (MME) may establish the D2D communication links, upon request of the transmitting D2D UE 432. For example, the transmitting D2D UE 432 may establish multicast D2D communication links with the first, second, and third receiving D2D UEs 431a, 431b, and 431c by the P2P discovery and paging procedure. In operation 513, the transmitting D2D UE 432 transmits a D2D communication request to the eNB 410. The transmitting D2D UE 432 uses resources already allocated for the D2D communication request by the eNB 410. It is assumed that the D2D communication request is transmitted, for example, on a random access channel or a sounding channel. As described before with reference to FIG. 4, all transmitting D2D UEs within a predetermined distance from an eNB, (i.e., all transmitting D2D UEs relatively near to the eNB) should transmit D2D communication requests with the same power to the eNB. The power of the D2D communication request is preset. For example, the power of the D2D communication request may be set through pilot transmission between the eNB 410 and the first, second, and third receiving D2D UEs 431a, 431b, and 431c and the transmitting D2D UE 432. The D2D communication request may include, for example, IDs of the transmitting D2D UE 432 and the first, second, and third receiving D2D UEs 431a, 431b, and 431c.

In operation 515, the eNB 410 measures a channel quality between the transmitting D2D UE 432 and the eNB 410 using a signal corresponding to the D2D communication request. The channel quality may be measured in terms of path loss, RSS, or SINR. The eNB 410 determines a distance $d_{TX}$ between the eNB 410 and the transmitting D2D UE 432 and compares the determined distance $d_{TX}$ with a predetermined $d_{TX}$ threshold. The $d_{TX}$ threshold may be determined based on a cell radius and UL power control parameters of cellular UEs.

Subsequently, the eNB 410 determines a resource allocation scheme for D2D communication based on the comparison result. For example, the resource allocation scheme may be an overlay scheme or an underlay scheme. The overlay scheme and the underlay scheme have been described with reference to FIGS. 3A and 3B and thus will not be described herein in detail. The eNB 410 compares the distance $d_{TX}$ to the transmitting D2D UE 432 with the $d_{TX}$ threshold. If the distance $d_{TX}$ to the transmitting D2D UE 432 is larger than the $d_{TX}$ threshold, the eNB 410 selects the underlay scheme for D2D communication. On the other hand, if the distance $d_{TX}$ to the transmitting D2D UE 432 is equal to or smaller than the $d_{TX}$ threshold, the eNB 410 selects the overlay scheme for D2D communication.

The eNB 410 may control the transmission power of the transmitting D2D UE 432 according to Equation (1).

$$P_{TX,D2D} = \beta \cdot P_{max,D2D} \quad \text{Equation} \ldots (1)$$

where $P_{max,D2D}$ is a maximum transmission power of the transmitting D2D UE 432 and $\beta$ is a power control parameter for controlling $P_{max,D2D}$. According to an embodiment of the present disclosure, the power control parameter is set so that '$\beta=1$' or '$0<\beta<1$' based on the determined resource allocation scheme.

For example, in the case of the overlay scheme for the transmitting D2D UE, since the transmitting D2D UE 432 does not interfere with the cellular UEs 420, the eNB 410 sets the transmission power of the transmitting D2D UE 432 to the maximum transmission power of the transmitting D2D UE 432 by setting $\beta=1$ ($P_{TX,D2D}=P_{max,D2D}$). In contrast, in the case of the underlay scheme for the transmitting D2D UE, the eNB 410 sets the transmission power of the transmitting D2D UE 432 to a value smaller than the maximum transmission power of the transmitting D2D UE 432 by setting $0<\beta<1$. Although $P_{max,D2D}$ is a system parameter representing the maximum transmission power of the transmitting D2D UE 432, $P_{max,D2D}$ is set to a value smaller than the maximum transmission power of the cellular UEs 420. For example, the eNB 410 may determine the maximum transmission power $P_{max,D2D}$ based on the signal corresponding to the D2D communication request received from the transmitting D2D UE 432. It is assumed that the maximum transmission power $P_{max,D2D}$ has been set for the transmitting D2D UE 432. For example, the maximum transmission power of a cellular UE may be set to 23 dBm in hardware in the fabrication process of the cellular UE.

In operation 517, the eNB 410 transmits a D2D reception indication to the first, second, and third receiving D2D UEs 431a, 431b, and 431c. The D2D reception indication includes information about the resource allocation scheme selected between the overlay scheme and the underlay scheme, power control parameter information for the determined resource allocation scheme, and resource allocation information for use in data reception during D2D communication. The resource allocation information specifies, for example, a D2D reception time, and time-frequency resources, a modulation scheme, and a coding scheme for D2D reception.

The eNB 410 transmits a D2D transmission indication to the transmitting D2D UE 432 in operation 519. The D2D transmission indication includes information about the resource allocation scheme selected between the overlay scheme and the underlay scheme, power control parameter information for the determined resource allocation scheme, and resource allocation information for use in data transmission during D2D communication. The resource allocation information specifies, for example, a D2D transmission time and time-frequency resources, a modulation scheme, and a coding scheme for D2D transmission.

Figure 5B:
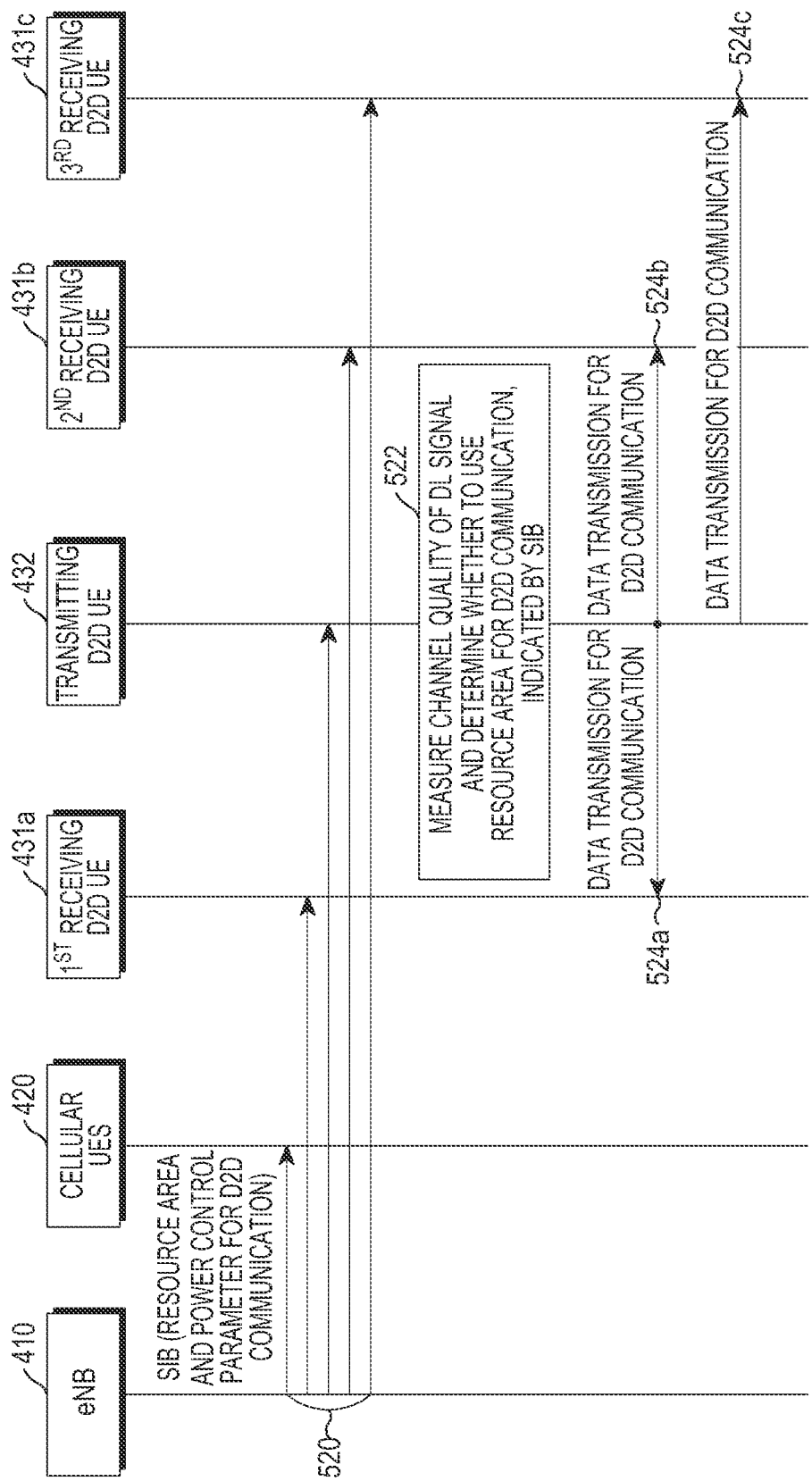
FIG. 5B is a diagram illustrating a signal flow for an operation for determining a resource allocation scheme for D2D communication in a cellular communication system according to an embodiment of the present disclosure.

FIG. 5B is a diagram illustrating a signal flow for an operation for determining a resource allocation scheme for D2D communication in a cellular communication system according to an embodiment of the present disclosure. For the convenience of description, it is assumed that the operation illustrated in FIG. 5B is performed in a cellular communication system having the configuration illustrated in FIG. 4.

Referring to FIG. 5B, the eNB 410 broadcasts in operation 520 a time-frequency resource area and power control parameters for D2D communication in a System Information Block (SIB) to all cellular UEs 420 and all D2D UEs including the transmitting D2D UE 432 and the first, second, and third receiving D2D UEs 431a, 431b, and 431c within the cell managed by the eNB 410. The resource area for D2D communication is a resource pool for D2D communication, allocated from among resources for cellular communication according to the overlay scheme. Since the SIB is broadcast information, all cellular UEs and D2D UEs may receive the SIB irrespective of whether the cellular UEs and D2D UEs are in RRC_CONNECTED mode or RRC_IDLE mode. All UEs may acquire system information from the SIB by receiving and decoding the SIB. The SIB may include, for example, bandwidth information, the number and period of subframes available for D2D communication, a power control threshold, and discovery range classes. The discovery range classes may be classified, for example, into a "short" region, a "medium" region, and a "long" region. The short region refers to a region relatively near to an eNB and thus may be mapped to a lowest power range among the three regions. The long region refers to a region relatively remote from the eNB and thus may be mapped to a highest power range among the three regions. The medium region is a region located in the middle between the short region and the long region and thus may be mapped to a medium power range.

In operation 522, the transmitting D2D UE 432 receives a DL signal such as CRS, DM-RS, P-RS, or MBS-RS from the eNB 410 and measures the channel quality of the received DL signal. The channel quality may be measured in terms of RSS, RSRP, RSRQ, or SINR. The transmitting D2D UE 432 determines whether to conduct D2D communication by comparing the measured channel quality with system information acquired from the SIB. For example, if the measured channel quality is an RSRP, the transmitting D2D UE 432 compares the measured RSRP with an RSRP threshold acquired from the SIB. If the measured RSRP is smaller than the RSRP threshold, the transmitting D2D UE 432 determines whether to conduct D2D communication using the resource allocation information acquired from the SIB based on the resource allocation region and the power control parameters acquired from the SIB. In another embodiment of the present disclosure, the transmitting D2D UE 432 may set the channel quality of the DL signal received from the eNB 410 in terms of another parameter, acquire a threshold for the parameter from the SIB, and determine whether to conduct D2D communication by comparing the channel quality with the threshold.

In operations 524a, 524b, and 524c, the transmitting D2D UE 432 communicates with the first, second, and third receiving D2D UEs 431a, 431b, and 431c by D2D communication. The transmission power of the transmitting D2D UE 432 may be determined based on a transmission power parameter acquired from the SIB. For example, if there is a table mapping transmission power levels for D2D communication to predetermined channel quality ranges, then the transmitting D2D UE 432 may acquire the table from the SIB. The table may map different transmission power levels to the afore-described different discovery range classes.

Thus the transmitting D2D UE 432 may transmit D2D data at a transmission power level corresponding to the channel quality, referring to the table. If the channel quality is an RSRP value, the "short", "medium", and "long" regions may be defined according to power levels predetermined based on the discovery range classes. Then the transmitting D2D UE 432 may transmit D2D data at a power level set for a region corresponding to the measured channel quality among the regions.

For the convenience of description, three discovery range classes are defined and mapped to power levels in the embodiment of the present disclosure. However, it is to be clearly understood that the present disclosure is also applicable to various numbers of discovery ranges. For example, two discovery range classes or four or more discovery ranges classes may be defined and mapped to power levels.

Figure 5C:
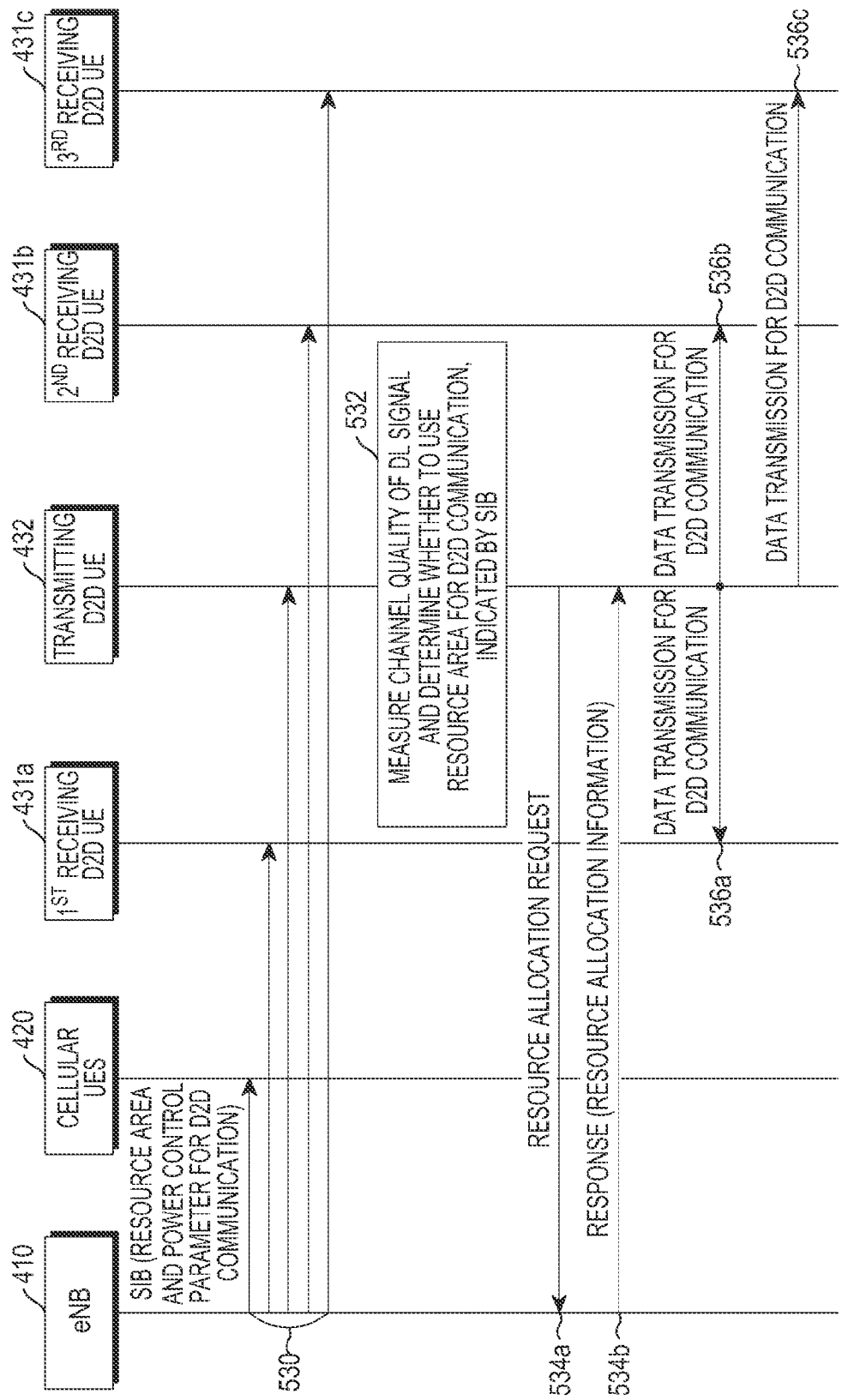
FIG. 5C is a diagram illustrating a signal flow for an operation for determining a resource allocation scheme for D2D communication in a cellular communication system according to an embodiment of the present disclosure.

FIG. 5C is a diagram illustrating a signal flow for an operation for determining a resource allocation scheme for D2D communication in a cellular communication system according to an embodiment of the present disclosure. For the convenience of description, it is assumed that the operation illustrated in FIG. 5C is performed in a cellular communication system having the configuration illustrated in FIG. 4.

Referring to FIG. 5C, a channel quality measurement operation in operations 530 and 532 is performed in the same manner as in operations 520 and 522 of FIG. 5B, except that the transmitting D2D UE 432 determines whether to conduct D2D communication by comparing the measured channel quality with system information acquired from an SIB in operation 532. For example, if the measured channel quality is an RSRP, the transmitting D2D UE 432 compares the measured RSRP with an RSRP threshold acquired from the SIB. If the measured RSRP is larger than the RSRP threshold, the transmitting D2D UE 432 determines to separately request resources for D2D communication. In operation 534a, the transmitting D2D UE 432 transmits a resource allocation request to the eNB 410. If the transmitting D2D UE 432 is in RRC_IDLE mode, the transmitting D2D UE 432 should switch to RRC_CONNECTED mode by an RA procedure to transmit the resource allocation request. If the transmitting D2D UE 432 is in the RRC_CONNECTED mode but the eNB 410 has not allocated resources for transmission of the resource allocation request to the transmitting D2D UE 432 yet, the transmitting D2D UE 432 should be allocated resources for transmitting the resource allocation request from the eNB 410 by the RA procedure. On the other hand, if the transmitting D2D UE 432 is in the RRC_CONNECTED mode and the eNB 410 has already allocated resources for transmission of the resource allocation request to the transmitting D2D UE 432, then the transmitting D2D UE 432 transmits the resource allocation request in the allocated resources. The resource allocation request may be transmitted on a PUCCH or piggybacked to data transmitted on a PUSCH in operation 534a. Upon receipt of the resource allocation request from the transmitting D2D UE 432, the eNB 410 replies with information about resources available to the transmitting D2D UE 432 on a Physical Downlink Control Channel (PDCCH) in operation 534b. The resources available to the transmitting D2D UE 432 are currently unused or randomly selected in the resource area for D2D communication indicated by the SIB.

The resources of the transmitting D2D UE 432 in the operation of FIG. 5B and resources of the transmitting D2D UE 432 in an operation of FIG. 5C according to another embodiment may be allocated to different subframes in Time Division Multiplexing (TDM) or the same subframe in FDM. In operations 536a, 536b, and 536c, the transmitting D2D UE 432 conducts data communication with the first, second, and third receiving D2D UEs 431a, 431b, and 431c by D2D communication in a resource area indicated by the resource allocation information acquired from the eNB 410. The transmitting D2D UE 432 may receive the resource allocation information in a message by RRC signaling or in an SIB. Also, a transmission power level for the transmitting D2D UE 432 may be received in the response or acquired from a table included in the SIB as described before with reference to FIG. 5B.

The various embodiments of FIGS. 5B and 5C may be implemented in combination. For example, four discovery range classes may be defined and mapped to power levels. Given the discovery range classes as "outage", "short", "medium", and "long", the operation of FIG. 5B is performed for the discovery range classes "short", "medium", and "long" except for the discovery range class "outage". The transmitting D2D UE 432 compares a measured channel quality with system information acquired from an SIB and transmits D2D data or control information at a power level mapped to the corresponding range class. The discovery range class "outage" is a parameter for transmitting D2D UEs that are very close to the eNB and thus may not reduce power. If the channel quality measured by the transmitting D2D UE 432 is larger than a channel quality value corresponding to "outage" included in the system information acquired from the SIB, the transmitting D2D UE 432 determines to separately request resources for D2D communication. Because the transmitting D2D UE 432 is too close to the eNB 410, the transmitting D2D UE 432 should use very lower power to minimize ICI/ISI or in-band emission to the receiver of the eNB 410 in the corresponding resources and thus may not conduct D2D communication. Therefore, the transmitting D2D UE 432 corresponding to the discovery range class "outage" should request resources separately. Or the transmitting D2D UE 432 corresponding to the discovery range class "outage" may give up D2D communication without requesting resources separately.

Figure 5D:
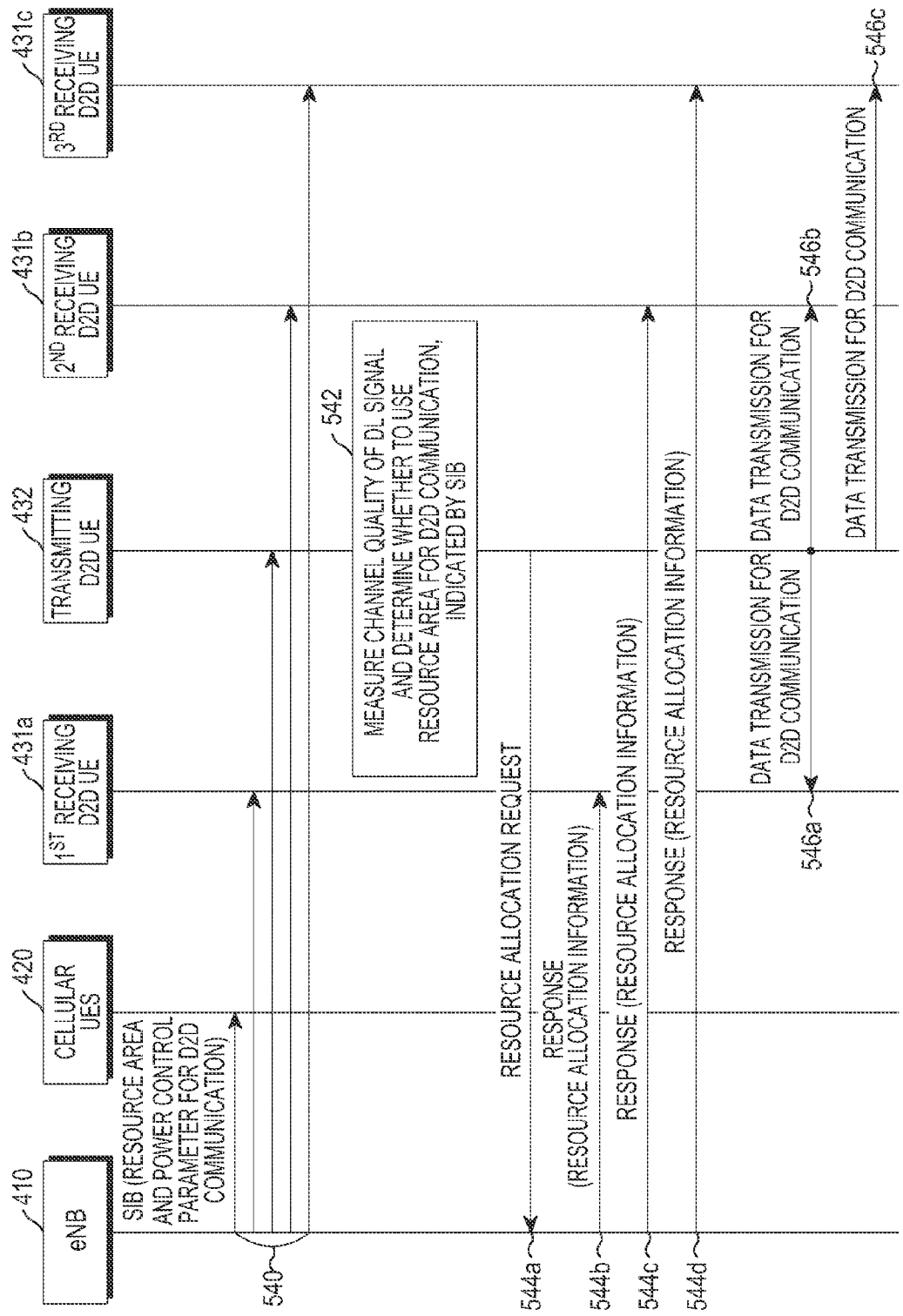
FIG. 5D is a diagram illustrating a signal flow for an operation for determining a resource allocation scheme for D2D communication in a cellular communication system according to an embodiment of the present disclosure.

FIG. 5D is a diagram illustrating a signal flow for an operation for determining a resource allocation scheme for D2D communication in a cellular communication system according to an embodiment of the present disclosure. For the convenience of description, it is assumed that the operation illustrated in FIG. 5D is performed in a cellular communication system having the configuration illustrated in FIG. 4.

Referring to FIG. 5D, operations 540 and 542 are identical to operations 530 and 532 of FIG. 5C. Thus the transmitting D2D UE 432 has determined to request resources for D2D communication separately according to the measurement result of operation 542. In operation 544a, the transmitting D2D UE 432 transmits a resource allocation request to the eNB 410. Compared to the embodiment of the present disclosure illustrated in FIG. 5C in which the eNB 410 transmits resource allocation information only to the transmitting D2D UE 432 in response to the resource allocation request of the transmitting D2D UE 432, the eNB 410 transmits the resource allocation information to the first, second, and third D2D UEs 431a, 431b, and 431c as well as the transmitting D2D UE 432 in response to the resource allocation request in operations 544b, 544c, and 544d in the embodiment of the present disclosure illustrated in FIG. 5D. The eNB 410 indicates, on a PDCCH, a time-frequency resource area for transmission and a time-frequency resource area for reception to all of the transmitting D2D UE 432 and the first and second receiving D2D UEs 431a and 431b. In the presence of an idle-mode UE among the first, second, and third receiving D2D UEs 431a, 431b, and 431c, the UE should be paged so that the UE may receive the PDCCH. Since idle-mode UEs should perform an RA procedure, this may generate much signaling overhead in the eNB 410. In another embodiment, the eNB may indicate a new time-frequency resource area in response to the resource allocation request of the transmitting D2D UE 432, in a message by RRC signaling, not on a PDCCH. Also, to allow the idle-mode receiving UE to receive the resource allocation information from the eNB 410, the eNB 410 may indicate by an SIB that the time-frequency resource area for reception has been changed. In operations 546a, 546b, and 546c, the transmitting D2D UE communicates with the respective receiving D2D UEs 431a, 431b, and 431c.

Figure 6A:
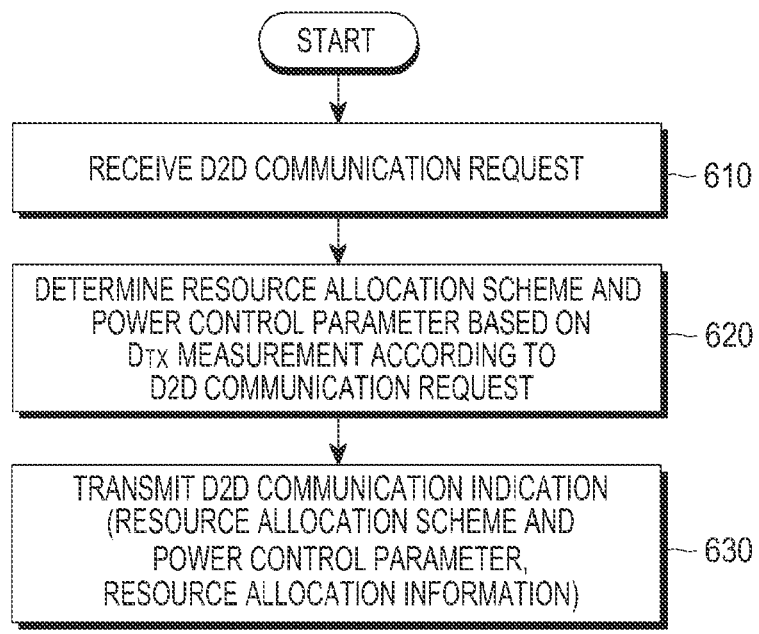
FIG. 6A is a flowchart illustrating an operation of an evolved Node B (eNB) for determining a resource allocation scheme and transmission power for D2D communication in a cellular communication system according to an embodiment of the present disclosure.

FIG. 6A is a flowchart illustrating an operation of an eNB for determining a resource allocation scheme and transmission power for D2D communication in a cellular communication system according to an embodiment of the present disclosure. For the convenience of description, it is assumed that the operation illustrated in FIG. 6A is performed based on the environment of the cellular communication system illustrated in FIGS. 4 and 5A.

Referring to FIG. 6A, the eNB receives a D2D communication request from a transmitting D2D UE in operation 610.

In operation 620, the eNB measures a distance $d_{TX}$ between the eNB and the transmitting D2D UE among D2D UEs with which D2D communication links included in the D2D communication request have been established, and determines a resource allocation scheme based on the measured distance $d_{TX}$. In an embodiment of the present disclosure, the distance $d_{TX}$ is determined in consideration of a measurement result of a signal corresponding to the D2D communication request. Then a power control parameter for D2D communication is determined according to the determined resource allocation scheme, which is described below with reference to FIG. 6B.

In operation 630, the eNB indicates the resource allocation scheme and transmits a D2D communication indication including resource allocation information to the D2D UEs. The D2D communication indication may be a D2D reception indication when the D2D communication indication is transmitted to a receiving D2D UE and may be a D2D transmission indication when the D2D communication indication is transmitted to a transmitting D2D UE. Information included in the D2D transmission/reception indication has been described before with reference to FIG. 5A and thus will not be described herein to avoid redundancy.

Figure 6B:
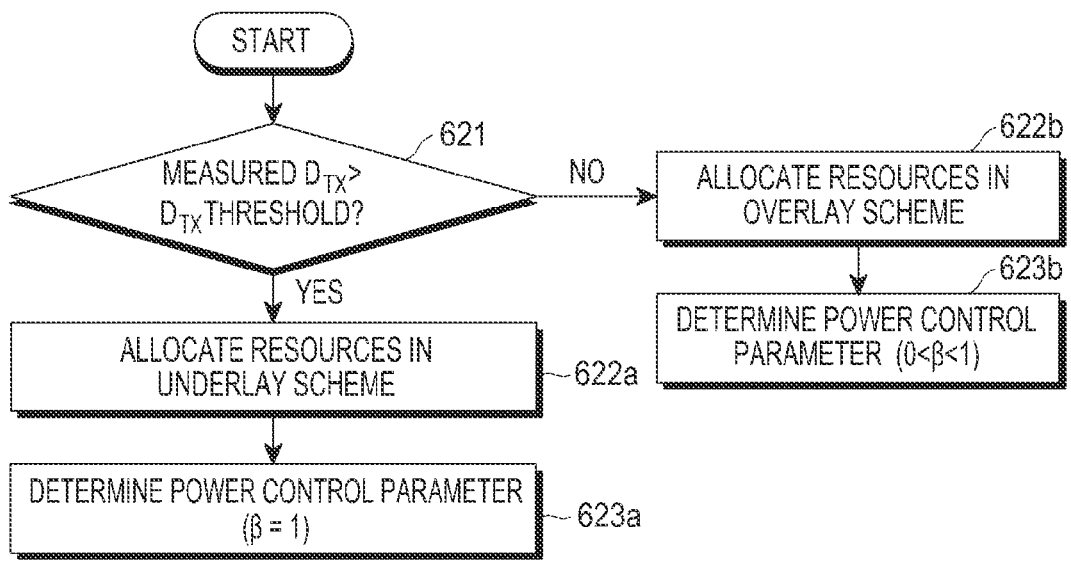
FIG. 6B is a detailed flowchart illustrating an operation of determining a power control parameter according to an embodiment of the present disclosure.

FIG. 6B is a detailed flowchart illustrating an operation of determining a power control parameter according to an exemplary embodiment of the present disclosure.

Referring to FIG. 6B, the eNB determines a distance $d_{TX}$ between the eNB and at least one of D2D UEs with which D2D communication links included in a D2D communication request have been established and compares the determined distance $d_{TX}$ with a predetermined $d_{TX}$ threshold in operation 621. The eNB 510 measures a distance $d_{TX}$ to a transmitting D2D UE using a signal corresponding to a D2D communication request received from the transmitting D2D UE.

If the distance $d_{TX}$ to the transmitting D2D UE is larger than the $d_{TX}$ threshold, the eNB determines the underlay scheme as a D2D communication resource allocation scheme in operation 622a. In operation 623a, the eNB sets a power control parameter for the D2D UE to 1, that is, $\beta=1$.

On the other hand, if the distance $d_{TX}$ to the transmitting D2D UE is equal to or smaller than the $d_{TX}$ threshold, the eNB determines the overlay scheme as the D2D communication resource allocation scheme in operation 622b and sets the power control parameter for the D2D UE to a value between 0 and 1, (i.e., $0<\beta<1$) in operation 623b.

Figure 6C:
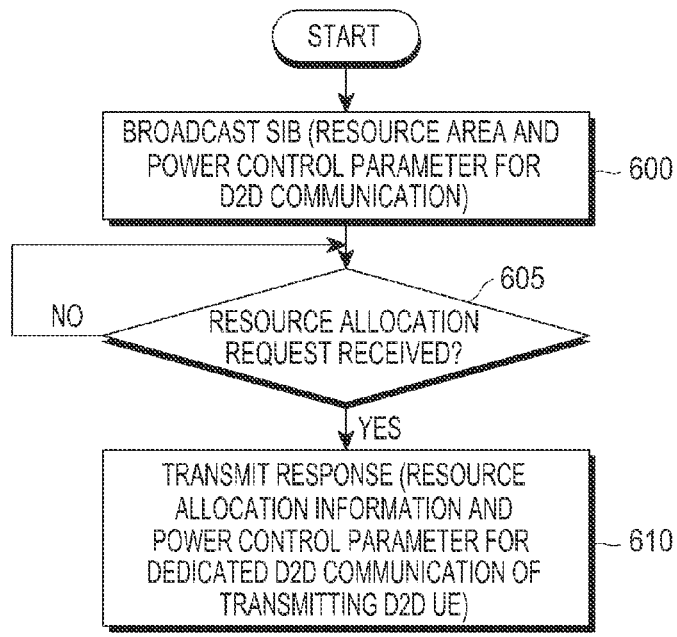
FIG. 6C is a flowchart illustrating an operation of an eNB for determining a resource allocation scheme and transmission power for D2D communication in a cellular communication system according to an embodiment of the present disclosure.

FIG. 6C is a flowchart illustrating an operation of an eNB for determining a resource allocation scheme and transmission power for D2D communication in a cellular communication system according to an embodiment of the present disclosure. For the convenience of description, it is assumed that the operation illustrated in FIG. 6C is performed based on the environment of the cellular communication system illustrated in FIGS. 4, 5B, 5C, and 5D.

Referring to FIG. 6C, the eNB broadcasts an SIB including information about a resource area and a power control parameter for D2D communication to all UEs within its cell in operation 600. In operation 605, the eNB determines whether a resource allocation request has been received from at least one transmitting D2D UE. The resource allocation request may be transmitted on a PUCCH, piggybacked to data transmitted on a PUSCH, or in a message by higher-layer signaling. If the resource allocation request has not been received, the eNB waits until receiving the resource allocation request. On the contrary, upon receipt of the resource allocation request, the eNB proceeds to operation 610. The resource allocation request may be transmitted on a PUCCH, piggybacked to data transmitted on a PUSCH, or in a message by higher-layer signaling Upon receipt of the resource allocation request from the transmitting D2D UE, the eNB replies with resource allocation information for D2D communication on a PDCCH or by Radio Resource Control (RRC) signaling in operation 610. The resource allocation information may include information about a time-frequency resource area and a transmission power value for transmission of the at least one transmitting D2D UE.

Figure 6D:
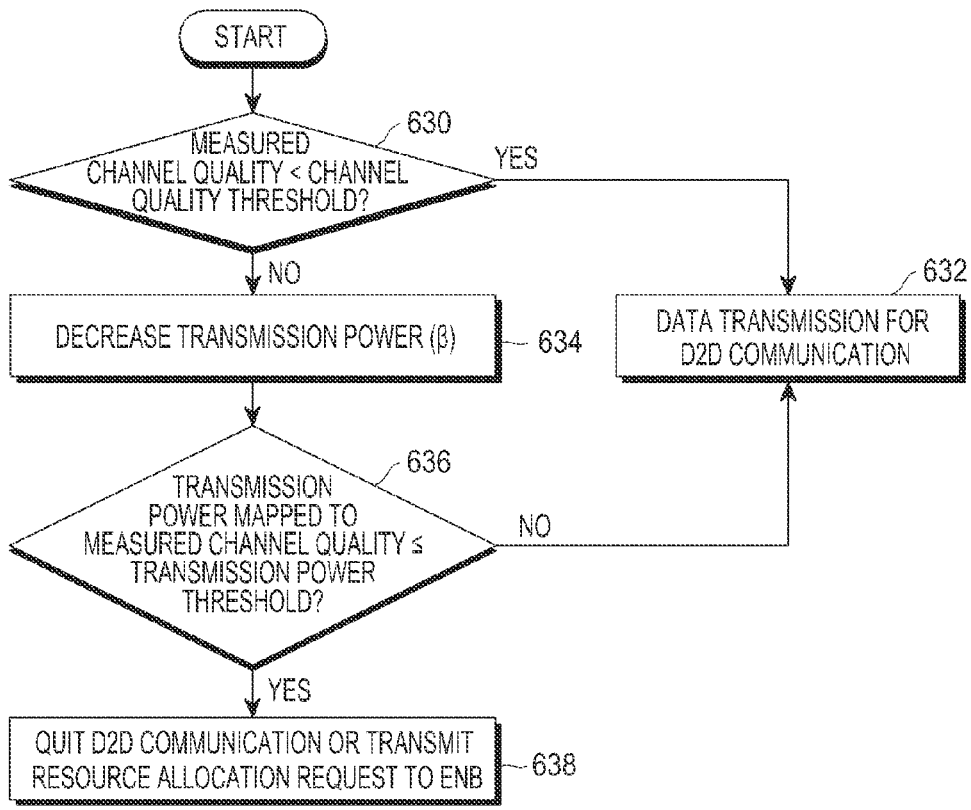
FIG. 6D is a flowchart illustrating an operation of a transmitting D2D UE in regard to the operation illustrated in FIG. 6C according to an embodiment of the present disclosure.

FIG. 6D is a flowchart illustrating an operation of a transmitting D2D UE in regard to the operation illustrated in FIG. 6C according to an embodiment of the present disclosure.

Referring to FIG. 6D, the transmitting D2D UE measures a channel quality between the eNB and the transmitting D2D UE and compares the measured channel quality with a channel quality threshold acquired from an SIB in operation 630. If the measured channel quality is smaller than the threshold, the transmitting D2D UE transmits data by D2D communication in a subframe according to resource allocation information for D2D communication acquired from the SIB in operation 632. The transmitting D2D UE may select resources for the data transmission on its own and may use a predetermined power value indicated by the SIB or a maximum transmission power ($\beta$=1) for the data transmission. The case of using a predetermined power value indicated by an SIB has been described with reference to operations 524a, 524b, and 524c of FIG. 5B.

On the other hand, if the measured channel quality is equal to or larger than the threshold, the transmitting D2D UE reduces its transmission power to a power level mapped to the measured channel quality in operation 634 according to another embodiment of the present disclosure. The transmitting D2D UE reduces a power control parameter $\beta$. Available $\beta$ values may be mapped, for example, to channel quality ranges and may be predefined in the SIB. In operation 636, the transmitting D2D UE determines whether the power level mapped to the measured channel quality is equal to or smaller than a specific threshold (e.g., $\beta \approx 0$). If the power level is larger than the threshold, the transmitting D2D UE transmits data for D2D communication with the reduced transmission power in operation 632.

If the power level is equal to or smaller than the threshold, the transmitting D2D UE gives up D2D communication or transmits a resource allocation request for D2D communication to the eNB in operation 638 as illustrated in FIGS. 5C and 5D. If the transmitting D2D UE transmits a resource allocation request for D2D communication to the eNB, the transmitting D2D UE may transmit data for D2D communication based on resource allocation information received from the eNB. As described before with reference to FIGS. 5C and 5D, the resource allocation information specifies an empty resource area or a randomly selected resource area in a resource area for D2D communication allocated through an SIB by the eNB.

If the transmitting D2D UE receives a PUCCH configuration in an SIB from the eNB, the transmitting D2D UE may transmit D2D data using a maximum transmission power in a D2D subframe to which a PUCCH is not allocated. The transmitting D2D UE continues the D2D communication using a power parameter acquired from the SIB until before its transmission power is reduced to or below a specific threshold. For this purpose, a timer-based operation may be performed. In this case, the power parameter determined by the transmitting D2D UE or the eNB is used continuously until expiration of a timer. For example, if the transmitting D2D UE determines the power parameter or receives the power parameter from the eNB, the transmitting D2D UE activates the timer. Upon occurrence of a D2D data transmission event before expiration of the timer, the transmitting D2D UE may transmit D2D data according to the already determined power parameter.

Figure 7A:
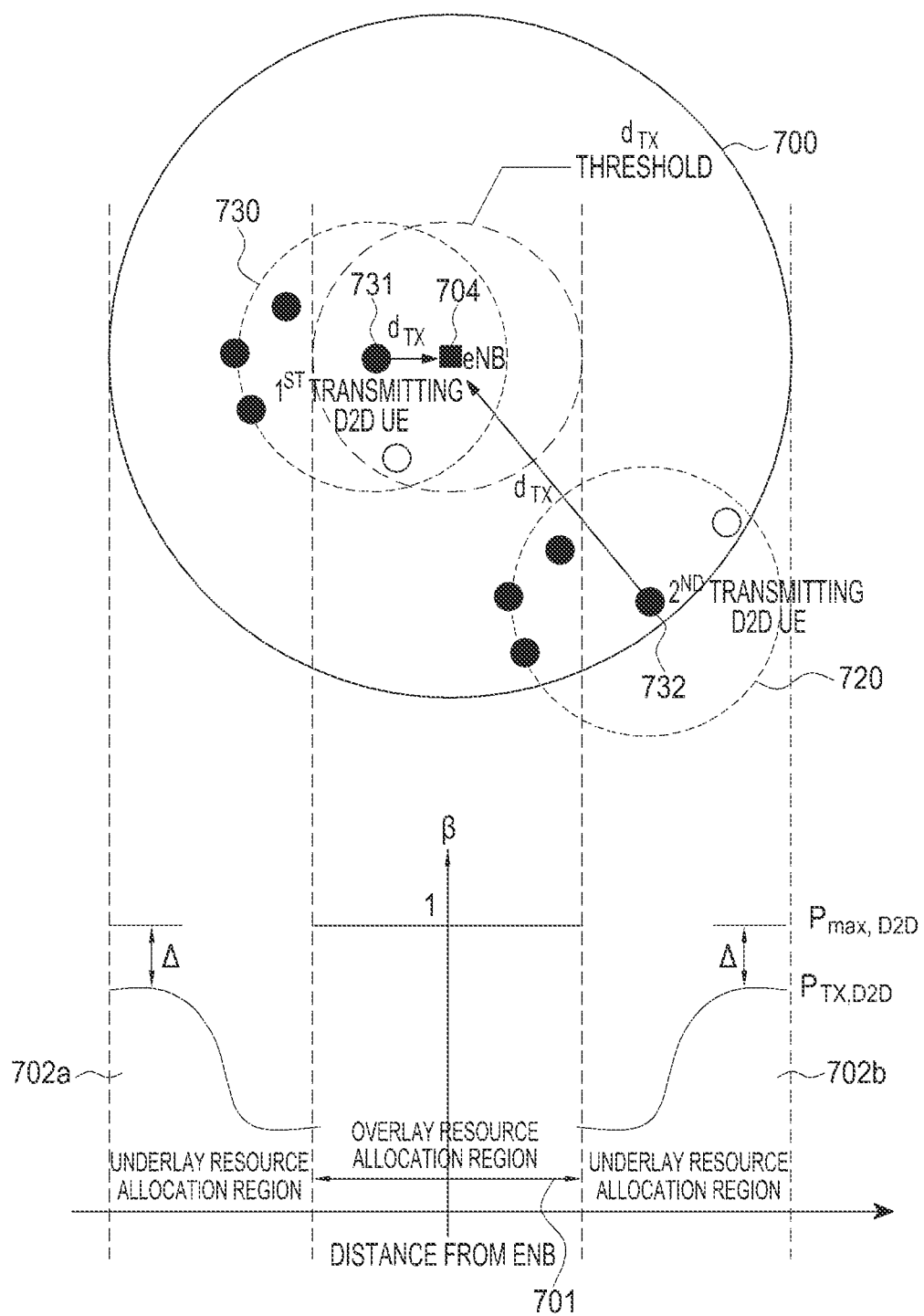
FIG. 7A illustrates a method for determining a power control parameter for cellular communication-based D2D communication according to an embodiment of the present disclosure.

FIG. 7A illustrates a method for determining a power control parameter for cellular communication-based D2D communication according to an embodiment of the present disclosure. For the convenience of description, the method is performed in the environment of the cellular communication system illustrated in FIG. 4.

Referring to FIG. 7A, an eNB 704, cellular UEs, and D2D UEs are communicating within the service coverage 700 of the eNB 704 in the cellular communication system. D2D communication links have been established for the D2D UEs by a P2P discovery and paging procedure and the resulting determined first and second transmitting D2D UEs 731 and 732 have transmitted D2D communication requests to the eNB 704. The eNB 704 calculates distances $d_{TX}$ between the eNB 704 and the first and second transmitting D2D UEs 731 and 732 using signals corresponding to the received D2D communication requests.

The eNB 704 determines a resource allocation scheme for each of the D2D communication service areas of the first and second D2D UEs 731 and 732 by comparing the calculated distances $d_{TX}$ with a $d_{TX}$ threshold.

For example, if the eNB 704 determines that the first transmitting D2D UE 731 is located in a $d_{TX}$ threshold region 701 within the service coverage 700 of the eNB 704, the eNB 704 determines the overlay scheme as a resource allocation scheme for a D2D communication area 730 of the first transmitting D2D UE 731. The eNB 704 also sets a power control parameter $\beta$ to '1' so that the transmission power of the first transmitting D2D UE 731 becomes its maximum transmission power. Therefore, upon receipt of the set $\beta$ value, the first transmitting D2D UE 731 sets its transmission power for D2D communication to its maximum transmission power ($P_{TX,D2D} = P_{max,D2D}$).

In another example, if the eNB 704 determines that the second transmitting D2D UE 732 is located in a region 702a or 702b other than the $d_{TX}$ threshold region 701 within the service coverage 700 of the eNB 704, the eNB 704 determines the underlay scheme as a resource allocation scheme for a D2D communication area 720 of the second transmitting D2D UE 732. The eNB 704 also sets a power control parameter $\beta$ to a value satisfying $0<\beta<1$ so that the transmission power of the second transmitting D2D UE 732 becomes lower than a maximum transmission power of the second transmitting D2D UE 732. Therefore, upon receipt of the set $\beta$ value, the second transmitting D2D UE 732 sets its transmission power for D2D communication to a value falling into a range lower than its maximum transmission power by Δ. Δ is a system parameter determined in consideration of interference that the cell causes to a neighbor cell. For example, if Δ is '0', the power control parameter is '1', which implies that the transmitting D2D UE does not interfere with the neighbor cell. If Δ is not '0', the transmitting D2D UE sets its transmission power to be lower than $P_{max,D2D}$ in consideration of interference that the transmitting D2D UE causes to the neighbor cell.

Figure 7B:
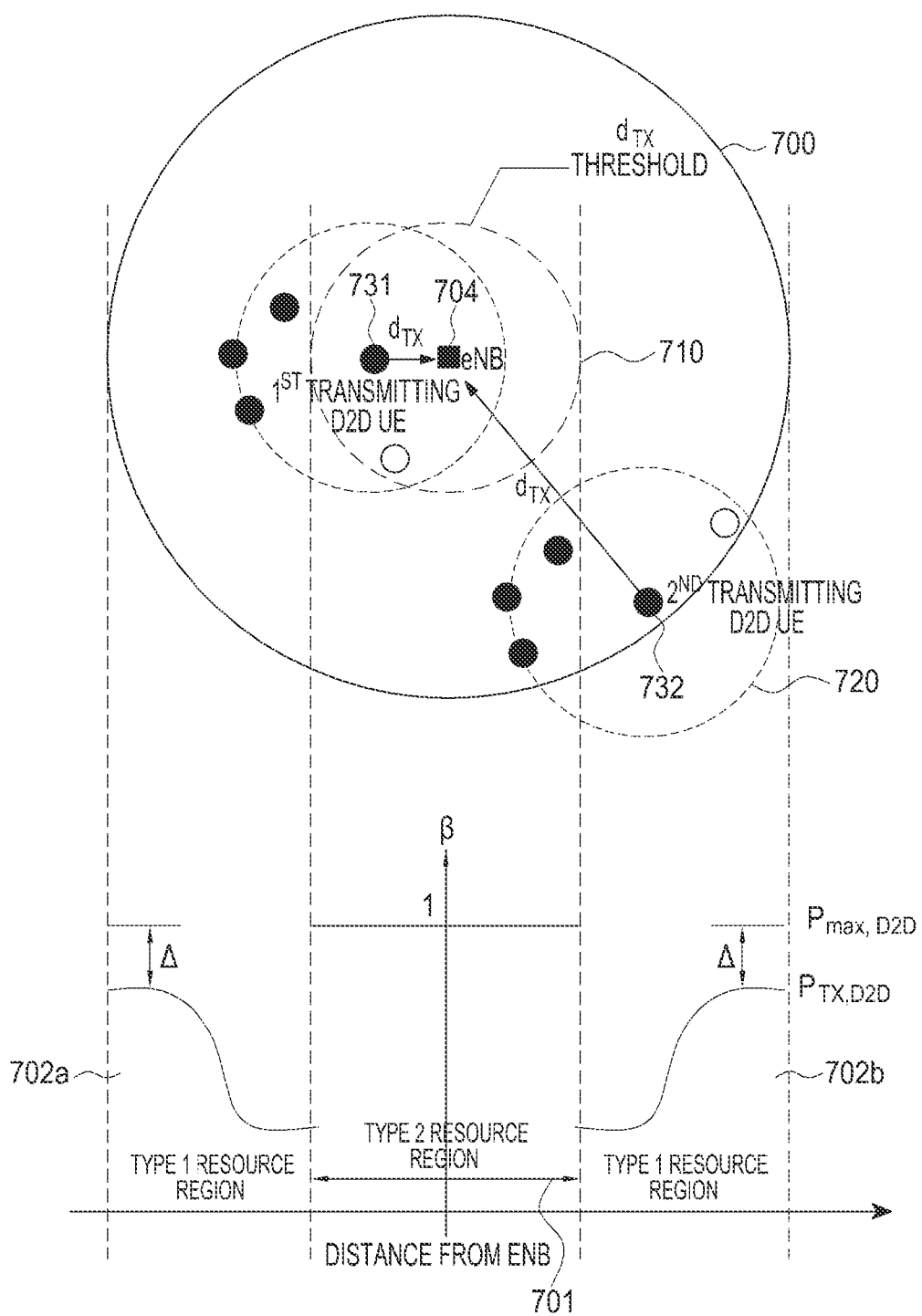
FIG. 7B illustrates a method for determining a power control parameter for cellular communication-based D2D communication according to another embodiment of the present disclosure.

FIG. 7B illustrates a method for determining a power control parameter for cellular communication-based D2D communication according to another embodiment of the present disclosure.

Referring to FIG. 7B, for the convenience of description, it is assumed that the method is performed in the same communication environment as for the method illustrated in FIG. 7A. While an underlay resource region and an overlay resource region are distinguished by a $d_{TX}$ threshold in the embodiment illustrated in FIG. 7A, it is assumed that resources are allocated for cellular communication and D2D communication in the overlay scheme in the embodiment illustrated in FIG. 7B. It is assumed that mutually orthogonal resources are used for cellular communication and D2D communication. It is also assumed that different two types of resource regions exist in a D2D communication resource region. In one of the two types of resource regions, a Type 1 resource region, an eNB indicates subframe indexes and a period of a resource area available for D2D communication by broadcasting an SIB so that D2D UEs may transmit and receive the SIB irrespective of RRC_IDLE mode or RRC_CONNECTED mode. In the other resource region, (i.e., a Type 2 resource region) although both a receiving D2D UE in RRC_IDLE mode and a receiving D2D UE in RRC_CONNECTED mode can receive signals using an SIB broadcast by the eNB, the eNB does not support a transmitting D2D UE in the RRC_IDLE mode. The transmitting D2D UE in the RRC_IDLE mode should switch to the RRC_CONNECTED mode, for D2D data transmission. The mode switch takes place in an RA procedure.

Referring to FIG. 7B, a whole D2D communication resource region is divided into Type 1 resource regions 702a and 702b and a Type 2 resource region 701, in the overlay scheme. In this case, the Type 1 resource regions 702a and 702b are distinguished from the Type resource region 701 by a $d_{TX}$ threshold. A resource allocation region is determined for a transmitting D2D UE according to the distance $d_{TX}$ of the transmitting D2D UE within the service coverage 700. Resources of the Type 2 resource region 701 are allocated to the first transmitting D2D UE 731 located within the service coverage 710 and a power level corresponding to the resource region is allocated to the first transmitting D2D UE 731. Likewise, resources of the Type 1 resource region 702b are allocated to the second transmitting D2D UE 702 located outside the service coverage 710 and a power level corresponding to the resource region is allocated to the second transmitting D2D UE 702.

Even when D2D communication resources are orthogonal to cellular communication resources, D2D communication conducted on a cellular UL may affect an eNB receiver by in-band emission or ICI/ISI. Accordingly, the transmission power of transmitting D2D UEs located within a predetermined range from the eNB, for example, the transmission power of the first transmitting D2D UE 731 should be controlled to reduce impairments caused to the eNB receiver. For example, the first transmitting D2D UE 731 may transmit a D2D communication request to the eNB 704 and the eNB 704 may accept the D2D communication request. The D2D communication request may be transmitted through a PUCCH, a PUSCH, or a Medium Access Control (MAC) control element. The eNB 704 may transmit information about time-frequency resources available to the first transmitting D2D UE 731 and a transmission power value for the time-frequency resource area on a PDCCH or a Physical Downlink Shared Channel (PDSCH) by higher-layer signaling in response to the D2D communication request of the first transmitting D2D UE.

Figure 7C:
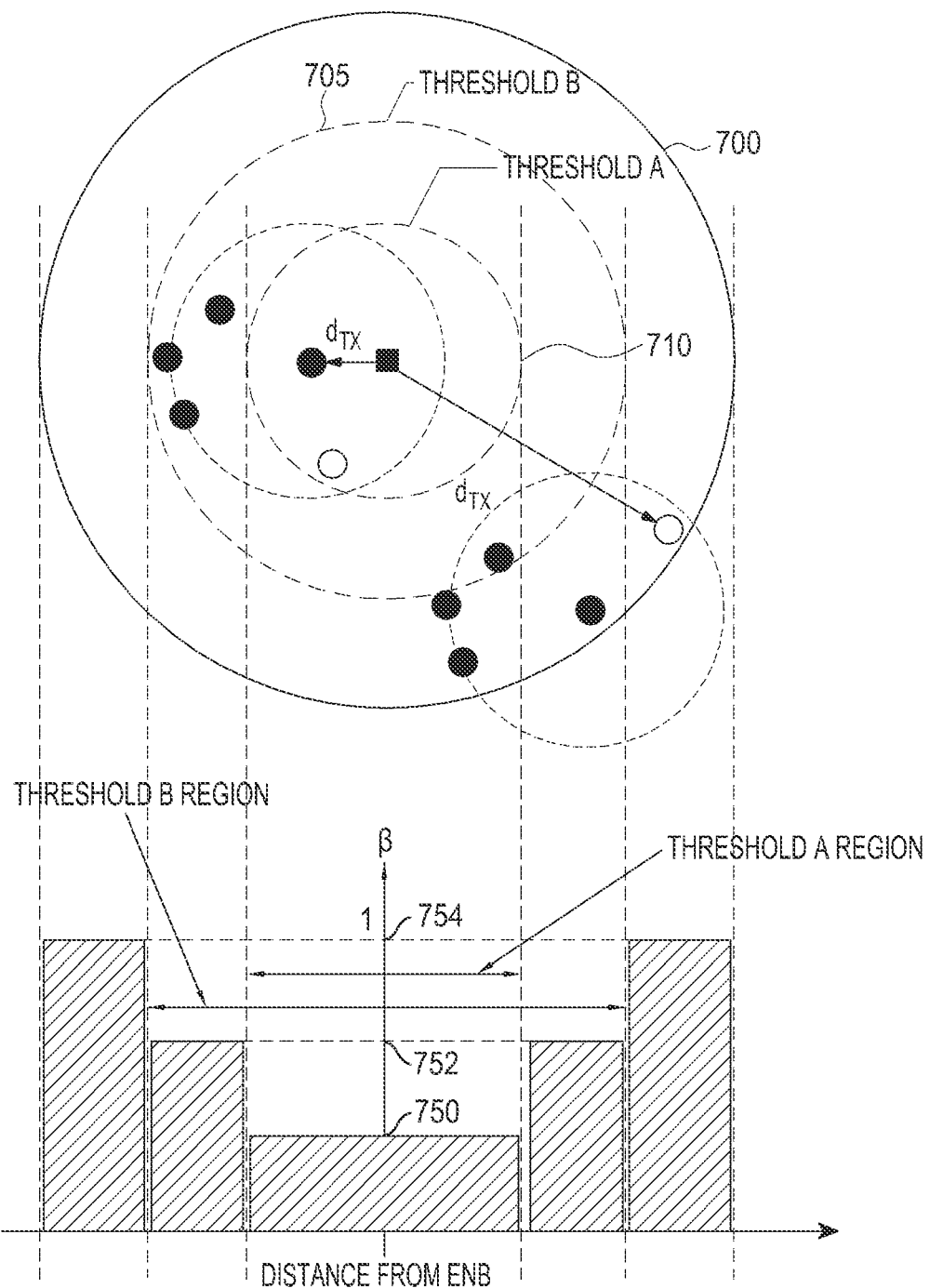
FIG. 7C illustrates a method for determining a power control parameter for cellular communication-based D2D communication according to another embodiment of the present disclosure.

FIG. 7C illustrates a method for determining a power control parameter for cellular communication-based D2D communication according to an embodiment of the present disclosure.

Referring to FIG. 7C, it is assumed that the method is performed in the same communication environment as for the method illustrated in FIG. 7A. While an overlay resource region is divided into a Type 1 resource region and a Type 2 resource region using a $d_{TX}$ threshold in the embodiment illustrated in FIG. 7B, transmission power may be controlled using two or more thresholds in a single resource region (Type 1 or Type 2) in the embodiment illustrated in FIG. 7C. For example, a transmitting D2D UE located in a region with a channel quality lower than a threshold A 710 uses a smallest β value 750, a transmitting D2D UE located in a region with a channel quality between the threshold A 710 and a threshold B 705 uses a medium β value 752, and a transmitting D2D UE located in a region with a channel quality higher than the threshold B 705 uses a highest β value 754. While two thresholds are used in the example, three or more thresholds may be used. The eNB may indicate the β values to the transmitting D2D UEs on a PDCCH or by higher layer signaling on a PDSCH. Or the eNB may broadcast the β values to all UEs within the cell by an SIB. Further, the transmitting D2D UEs may determine the β values based on power control information acquired from an SIB.

Referring to FIG. 7C, an eNB measures a UL channel received from a transmitting D2D UE and compares the measurement with a threshold. In FIG. 7C, a transmitting D2D UE may measure a DL signal received from an eNB and compare the measurement with a threshold. The DL signal may be at least one of CRS, DM-RS, CSI-RS, P-RS, and MBS-RS. A transmitting D2D UE having a measured channel quality smaller than the threshold A 710 uses the lowest β value 750, a transmitting D2D UE having a measured channel quality between the threshold A 710 and the threshold B 705 uses the medium β value 752, and a transmitting D2D UE having a measured channel quality larger than the threshold B 705 uses the highest β value 754. While two thresholds are used in the example, three or more thresholds may be used. It is assumed that the β values have already been acquired before D2D communication.

Figure 8:
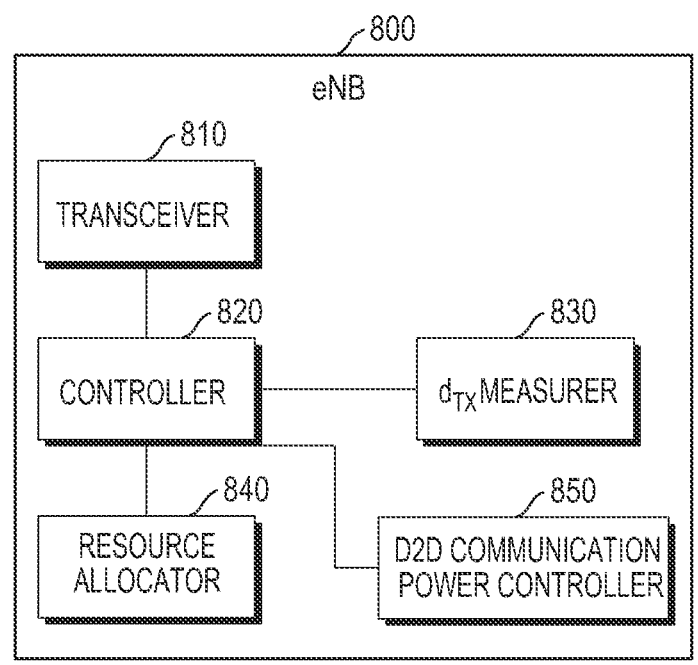
FIG. 8 is a block diagram of an eNB according to an embodiment of the present disclosure.

FIG. 8 is a block diagram of an eNB according to an embodiment of the present disclosure.

Referring to FIG. 8, an eNB 800 includes a transceiver 810, a controller 820, a $d_{TX}$ measurer 830, a resource allocator 840, and a D2D communication power controller 850. The components of the eNB 800 are separately shown for the sake of convenience. A plurality of components may be incorporated into a single unit or one component may be divided into smaller units according to an embodiment or the intent of an operator. Each component of the eNB 800 operates according to the embodiments illustrated in FIGS. 4 to 7C.

The transceiver 810 receives a D2D communication request from a D2D UE and transmits to the D2D UE a D2D transmission/reception indication including information indicating a resource allocation scheme and resource allocation information, which are determined based on the D2D communication request.

Upon receipt of the D2D communication request, the controller 820 commands determination of a resource allocation scheme for D2D communication and a power control parameter for power control by transmitting a signal corresponding to the D2D communication request to the $d_{TX}$ measurer 830, the resource allocator 840, or the D2D communication power controller 850.

The $d_{TX}$ measurer 830 measures a channel quality using the signal corresponding to the D2D communication request in response to the command of the controller 802 and measures a distance $d_{TX}$ between the D2D UE and the eNB based on the channel quality.

The resource allocator 840 determines a resource allocation scheme for D2D communication by comparing the measured distance $d_{TX}$ with a predetermined $d_{TX}$ threshold in response to the command of the controller 810. A decision is made on a resource allocation scheme in the method described before with reference to FIG. 6B.

The D2D communication power controller 850 determines a power control parameter according to the determined resource allocation scheme for D2D communication and sets the transmission power of the D2D UE, in response to the command of the controller 802. The specific procedure for determining a power control parameter has also been described before with reference to FIG. 6B and thus will not be described herein.

Figure 9A:
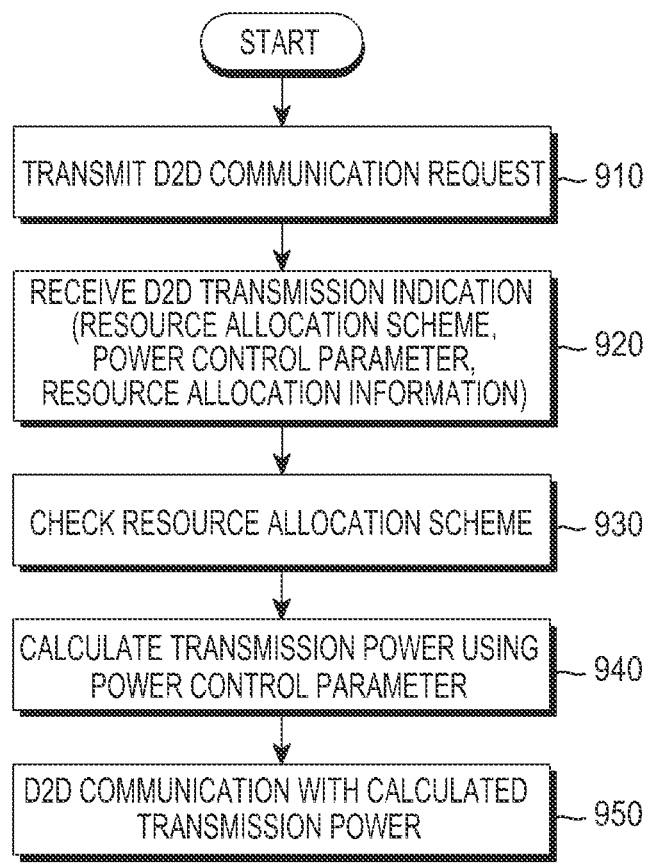
FIG. 9A is a flowchart illustrating an operation of a transmitting D2D UE that conducts D2D communication in a cellular communication system according to an embodiment of the present disclosure.

FIG. 9A is a flowchart illustrating an operation of a transmitting D2D UE that conducts D2D communication in a cellular communication system according to an embodiment of the present disclosure. The operation of the transmitting D2D UE is performed according to the aforedescribed embodiment illustrated in FIG. 5A.

Referring to FIG. 9A, the transmitting D2D UE transmits a D2D communication request to an eNB within a service area in operation 910.

In operation 920, the transmitting D2D UE receives a D2D transmission indication from the eNB in response to the transmitted D2D communication request. The D2D transmission request includes information indicating a resource allocation scheme, resource allocation information, and a power control parameter.

The transmitting D2D UE checks the resource allocation information about D2D communication resources in the D2D transmission indication in operation 930.

The transmitting D2D UE identifies the power control parameter in the D2D transmission indication and calculates a transmission power for D2D communication in operation 940. The method for determining the power control parameter has been described before with reference to FIG. 6B and thus will not be described herein.

In operation 950, the transmitting D2D UE conducts D2D communication with the calculated transmission power in resources indicated by the resource allocation information.

Figure 9B:
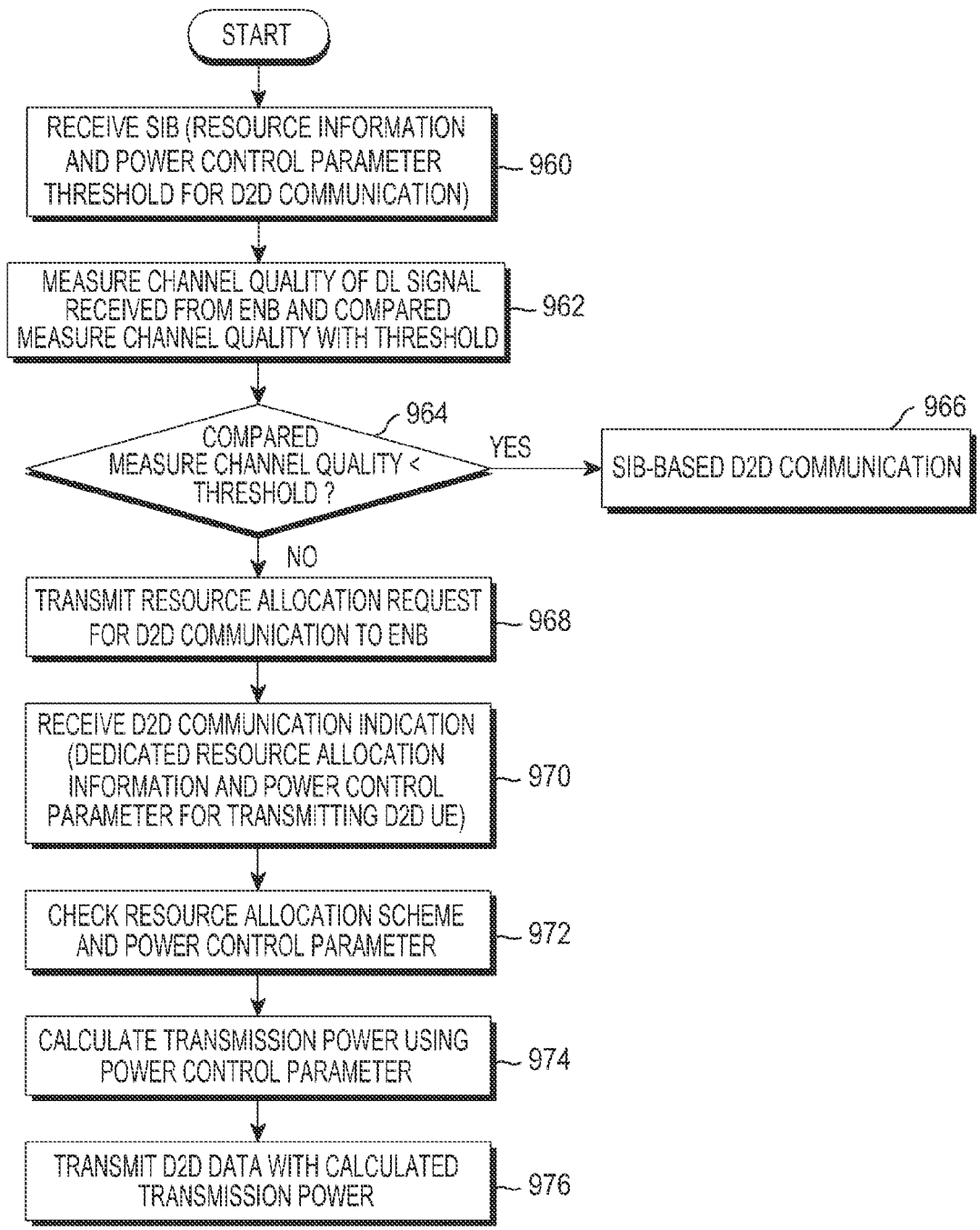
FIG. 9B is a flowchart illustrating an operation of a transmitting D2D UE that conducts D2D communication in a cellular communication system according to another embodiment of the present disclosure.

FIG. 9B is a flowchart illustrating an operation of a transmitting D2D UE that conducts D2D communication in a cellular communication system according to an embodiment of the present disclosure. The operation of the transmitting D2D UE is performed according to the aforedescribed embodiments illustrated in FIGS. 5B, 5C, and 5D.

Referring to FIG. 9B, the transmitting D2D UE receives resource allocation information and power control parameters (threshold(s), β value(s), and outage) for D2D communication in an SIB broadcast by an eNB in operation 960. In operation 962, the transmitting D2D UE measures a channel quality between the eNB and the transmitting D2D UE using one or more of DL signals received from the eNB. The transmitting D2D UE compares the measured channel quality with a threshold acquired from the SIB. If the measured channel quality is smaller than the threshold in operation 964, the transmitting D2D UE conducts D2D communication using a β value acquired from the SIB in operation 966.

On the other hand, if the measured channel quality is equal to or larger than the threshold in operation 964, the transmitting D2D UE transmits a resource allocation request for D2D communication to the eNB in operation 968. If the transmitting D2D UE is in RRC_IDLE mode, the transmitting D2D UE performs an RA procedure so that the eNB may allocate resources for transmission of the resource allocation request. If the transmitting D2D UE is in RRC_CONNECTED mode but resources for transmission of the resource allocation request have not been allocated to the transmitting D2D UE, the transmitting D2D UE is allocated resources for transmission of the resource allocation request by the RA procedure as in the RRC_IDLE mode. If the transmitting D2D UE is in the RRC_CONNECTED mode and resources for transmission of the resource allocation request have been allocated to the transmitting D2D UE, the transmitting D2D UE transmits the resource allocation request in the allocated resources to the eNB.

In operation 970, the transmitting D2D UE receives a D2D communication indication from the eNB in response to the resource allocation request. The D2D communication indication includes information about resources unused in or randomly selected from a resource allocation area for D2D communication indicated by the SIB. The resource information indicates resources dedicated to the transmitting D2D UE. The D2D communication indication further includes a power control parameter to be used by the transmitting D2D UE. The eNB transmits the D2D communication indication on a PDCCH or by higher-layer signaling on a PDSCH. In operation 972, the transmitting D2D UE checks time-frequency resources allocated by the eNB and power control parameters by decoding the D2D communication indication. The transmitting D2D UE calculates a transmission power based on the power control parameters in operation 974 and transmits D2D data with the calculated transmission power in operation 976. In another embodiment, the eNB may broadcast the resource allocation information to receiving D2D UEs in an SIB.

Figure 10:
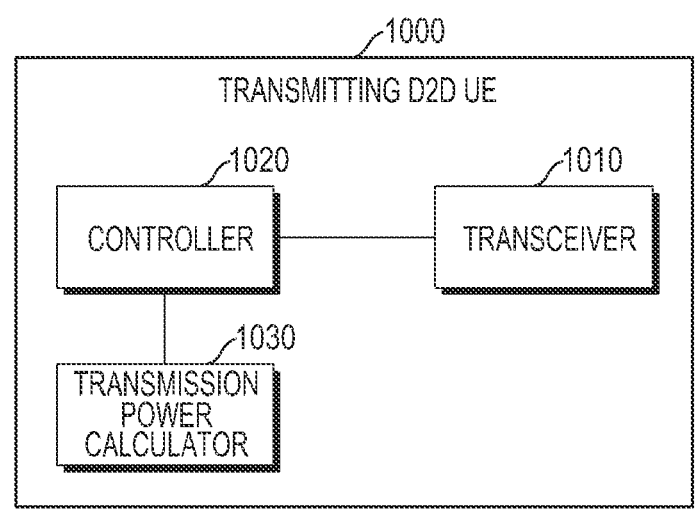
FIG. 10 is a block diagram of a transmitting D2D UE that conducts D2D communication in a cellular communication system according to an embodiment of the present disclosure.

FIG. 10 is a block diagram of a transmitting D2D UE that conducts D2D communication in a cellular communication system according to an embodiment of the present disclosure.

Referring to FIG. 10, a transmitting D2D UE 1000 includes a transceiver 1010, a controller 1020, and a transmission power controller 10300. The components of the transmitting D2D UE 1000 are separately shown for the sake of convenience. A plurality of components may be incorporated into a single unit or one component may be divided into smaller units. Each component of the transmitting D2D UE 1000 operates according to the embodiments illustrated in FIGS. 4 to 7C.

For D2D communication, the transceiver 1010 transmits a D2D communication request to an eNB and receives a D2D transmission indication from the eNB.

Upon receipt of the D2D transmission indication, the controller 1020 checks power control parameters in the D2D transmission indication and transmits the power control parameters to the transmission power controller 1030. The specific procedure for determining a power control parameter has also been described before with reference to FIG. 6B and thus will not be described herein.

The transmission power controller 1030 calculates a transmission power for the transmitting D2D UE based on the power control parameters.

According to another embodiment of the present disclosure, the transceiver 1010 receives a broadcast SIB and a DL signal from the eNB. The controller 1020 receives a channel quality measurement of the DL signal, acquires a threshold from the SIB, and compares the channel quality measurement with the threshold. Then the controller 1020 determines whether to use a resource allocation area for D2D communication, indicated by the SIB or to transmit a separate resource allocation request. An operation for conducting D2D communication according to the comparison result has been described before with reference to FIGS. 5B, 5C, and 5D and thus will not be described herein.

The proposed method and apparatus for allocating resources for D2D communication may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, resources are allocated to a D2D UE according to a DL or UL channel quality between an eNB and the D2D UE and transmission/reception power is controlled according to the result of resource allocation, in cellular communication-based D2D communication. Therefore, resource use efficiency can be increased and the load of a cellular communication system can be distributed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for allocating resources for a device-to-device (D2D) communication at a device, the method comprising:
   receiving, from a base station (BS), resource allocation information comprising information about a first resource and first power control information for the D2D communication, the first resource for the D2D communication being a part of a cellular communication resource;
   measuring a channel quality of a downlink signal received from the BS;
   if the measured channel quality is smaller than a predetermined threshold, conducting the D2D communication using the resource allocation information;
   if the measured channel quality is larger than the predetermined threshold, transmitting, to the BS, a resource request for the D2D communication;
   receiving, from the BS, a response in response to the resource request; and
   transmitting data for the D2D communication using a second resource and second power control information indicated by the response.

2. The method of claim 1, further comprising:
   decreasing, if the measured channel quality is larger than the predetermined threshold, a transmission power of the device by a predetermined level obtained from the first power control information; and
   conducting, if the decreased transmission power is equal or higher than a transmission power threshold, the D2D communication using the resource allocation information.

3. The method of claim 1, wherein the second resource is a dedicated resource allocated for the D2D communication of the device among the first resource.

4. The method of claim 1, wherein the response is broadcasted.

5. The method of claim 1, wherein the first power control information includes at least one of a transmission power threshold and a plurality of power ranges determined based on a distance between the BS and the device.

6. The method of claim 1, further comprising:
   if a transmission power of the device is included in a minimum power range obtained from the first power control information, transmitting, to the BS, the resource request for the D2D communication.

7. The method of claim 1, wherein if a transmission power of the device is included in a minimum power range obtained from the first power control information, the D2D communication is stopped.

8. A method for allocating resources for a device-to-device (D2D) communication to a device at a base station (BS), the method comprising:
   broadcasting resource allocation information comprising information about a first resource and first power control information for the D2D communication the first resource for the D2D communication being part of a cellular communication resource;
   receiving, from the device, a resource request;
   when the resource request is received from the device, recognizing a channel quality of a downlink signal measured by the device is larger than a predetermined threshold; and
   transmitting, to the device, a response comprising a second resource and second power control information, wherein the second resource is a dedicated resource allocated for the D2D communication of the device.

9. The method of claim 8, wherein the response is broadcasted.

10. The method of claim 8,
    wherein the first power control information includes at least one of a transmission power threshold and a plurality of power ranges determined based on a distance between the BS and the device.

11. The method of claim 8, wherein if a transmission power of the device is included in a minimum power range obtained from the first power control information, the resource request for the D2D communication is received from the device or the D2D communication is stopped.

12. A device configured to conduct a device-to-device (D2D) communication, the device comprising:
    a transceiver configured to receive, from a base station (BS), resource allocation information comprising information about a first resource and first power control information for the D2D communication, the first resource being a part of a cellular communication resource; and a controller configured to:
  measure a channel quality of a downlink signal received from the BS,
  if the measured channel quality is smaller than a predetermined threshold, control the transceiver to conduct the D2D communication using the resource allocation information, and
  if the measured channel quality is larger than the predetermined threshold, control the transceiver to:
    transmit, to the BS, a resource request for the D2D communication,
    receive, from the BS, a response in response to the resource request, and
    transmit data for the D2D communication using a second resource and second power control information indicated by the response.

13. The device of claim 12, wherein if the measured channel quality is larger than the threshold, the controller decreases a transmission power of the device by a predetermined level obtained from the first power control information, and
  if the decreased transmission power is equal or higher than a transmission power threshold, the controller controls the transceiver to conduct the D2D communication using the resource allocation information.

14. The device of claim 12, wherein the second resource is a dedicated resource allocated for the D2D communication of the device among the first resource.

15. The device of claim 12, wherein the response is broadcasted.

16. The device of claim 12, wherein the first power control information includes at least one of a transmission power threshold and a plurality of power ranges determined based on a distance between the BS and the device.

17. The device of claim 12, wherein if a transmission power of the device is included in a minimum power range obtained from the first power control information, the controller configured to control the transceiver to transmit, to the BS, the resource request for the D2D communication.

18. The device of claim 12, wherein if a transmission power of the device is included in a minimum power range obtained from the first power control information, the D2D communication is stopped.

19. A base station (BS) for allocating resources for a device-to-device (D2D) communication to a device, the BS comprising:
  a transceiver configured to broadcast resource allocation information comprising information about a first resource and first power control information for the D2D communication, the first resource for the D2D communication being a part of a cellular communication resource, and receive, from the device, a resource request; and
  a controller configured to, when the resource request is received from the device, recognize a channel quality of a downlink signal measured by the device is larger than a predetermined threshold, and control the transceiver to transmit, to the device, a response comprising a second resource and second power control information in response to the resource request, wherein the second resource is a dedicated resource allocated for the D2D communication of the device.

20. The BS of claim 19, wherein the response is broadcasted.

21. The BS of claim 19, wherein the first power control information includes at least one of a transmission power threshold and a plurality of power ranges determined based on a distance between the BS and the device.

22. The BS of claim 19, wherein if a transmission power of the device is included in a minimum power range obtained from the first power control information, the resource request for the D2D communication is received from the device or the D2D communication is stopped.

* * * * *